US012425520B2

(12) United States Patent
Garg

(10) Patent No.: US 12,425,520 B2
(45) Date of Patent: Sep. 23, 2025

(54) WIRELESS ALTERNATIVE TO LOCAL ANALOG TELEPHONE SYSTEM

(71) Applicant: 10T SOLUTIONS, INC., Wakefield, MA (US)

(72) Inventor: Jatin Garg, Wakefield, MA (US)

(73) Assignee: 10T SOLUTIONS, INC., Wakefield, MA (US)

( * ) Notice: Subject to any disclaimer, the term of this patent is extended or adjusted under 35 U.S.C. 154(b) by 203 days.

(21) Appl. No.: 18/504,833

(22) Filed: Nov. 8, 2023

(65) Prior Publication Data

US 2024/0297938 A1   Sep. 5, 2024

Related U.S. Application Data

(60) Provisional application No. 63/487,806, filed on Mar. 1, 2023.

(51) Int. Cl.
| | |
|---|---|
| *H04M 7/00* | (2006.01) |
| *H04W 36/14* | (2009.01) |
| *H04W 40/02* | (2009.01) |

(52) U.S. Cl.
CPC ......... *H04M 7/0069* (2013.01); *H04W 36/14* (2013.01); *H04W 40/02* (2013.01)

(58) Field of Classification Search
CPC ......... H04M 7/0069; H04M 2207/206; H04W 36/14; H04W 40/02; H04W 8/183; H04W 76/10

See application file for complete search history.

(56) References Cited

U.S. PATENT DOCUMENTS

| | | | |
|---|---|---|---|
| 2005/0105512 A1 | 5/2005 | Myhre et al. | |
| 2006/0114883 A1* | 6/2006 | Mehta | H04W 12/068 |
| | | | 370/352 |
| 2007/0254609 A1* | 11/2007 | Rosenthal | H02J 9/061 |
| | | | 455/127.1 |
| 2009/0271725 A1 | 10/2009 | Dirla | |

(Continued)

FOREIGN PATENT DOCUMENTS

WO   WO-2007015075 A1 *   2/2007   ......... H04L 12/5692

OTHER PUBLICATIONS

International Patent Application No. PCT/US2024/017719; Int'l Search Report and the Written Opinion; dated Jun. 26, 2024; 18 pages.

*Primary Examiner* — Marisol Figueroa
(74) *Attorney, Agent, or Firm* — BakerHostetler

(57) ABSTRACT

A POTS alternative including an uninterruptible power supply (UPS), a router, a modbus converter for connecting the router to the UPS to monitor conditions of the UPS, a gateway for providing connections to one or more POTS-based customer premises equipment through the modbus converter to the router and directly to the router. The router includes a plurality of SIM cards, each SIM card for connecting to one cellular service provider among a plurality of cellular service providers. The router automatically connecting to a cellular service provider among the plurality of cellular service providers providing the strongest cellular signal and switching from the cellular service provider to a different cellular service providers when the different cellular service provider provides a stronger cellular signal when the cellular service provider no longer provides the strongest cellular signal.

20 Claims, 65 Drawing Sheets

POTS Alternative - Solution Overview

(56) References Cited

U.S. PATENT DOCUMENTS

| | | |
|---|---|---|
| 2014/0269470 A1 | 9/2014 | Hybertson et al. |
| 2017/0194790 A1 | 7/2017 | Kim et al. |
| 2021/0006991 A1 | 1/2021 | Rucker et al. |

\* cited by examiner

/ Overview / System Status

This page was last updated at 1/22/2023 4:48:50 PM. ↻ Refresh

System
- Product Section: Vega 60Gv2
- Serial Number:
- Firmware File: VEGAARMv2_R120S020
- Version Information | License Information LAN
- IP Address LAN 1
- LAN Gateway
- LAN Information | Switch Information Registrar and Proxy
- Domain
- Proxy
- Registrar SIP Registration
- Registered Users: 2 of 2 users registered
- SIP Registration Media
- DSP Status: ACTIVE
- DSP Information Time and Date
- Time (hh:mm:ss): 16:48:48
- Date (mm/dd/yy/): 01/22/2023

Interfaces
- FXS: 2 of 4 in service
- Port Information

Calls
- Answers: 813
- Total: 999
- Call Information

Useful Links
- Show Plan | Show Paths | Show Log | Show Support | Show Config Changes | Show System Stats

FIG. 2A

⌂ / Configuration / Expert Config / LAN/WAN

⚠ Warning: Changing these parameters may prevent remote access.

⊞ Expand All

Hostname

Vega60Gv2

⊘ Submit

LAN Mode ⓘ Help

LAN Backup Mode

⊘ Submit

LAN Configuration ⓘ Help

| LAN Port | DHCP | IP Address | Subnet | Allow Full Duplex | Allow 10 BASE-T | Allow 100 BASE-TX | Allow 1000 BASE-T | 802.1pQ QoS Profile | Accept non 802.1pQ tagged frames | Tx Rate Limit (kbps) |
|---|---|---|---|---|---|---|---|---|---|---|
| 1 | ☐ | | | ☑ | ☑ | ☑ | ☑ | 1 - Default ⌄ | ☑ | 0 |

⊘ Submit

⊞ Default Route

⊞ Static Routes

⊞ LAN Profiles

⊞ DNS Parameters

⊞ File Transfer Method

FIG. 2B

/ Configuration / Expert Config / POTS Configuration

Ports

| Port | Type | Enabled | Mode | Caller ID | Call Transfer | Call Waiting | Call Conference | DND Enable |
|------|------|---------|------|-----------|---------------|--------------|-----------------|------------|
| All  |      | -- ⌄    | -- ⌄ | -- ⌄      | -- ⌄          | -- ⌄         | -- ⌄            | -- ⌄       |
| 1    | FXS  | ☑       | normal ⌄ | on ⌄  | on ⌄          | off ⌄        | off ⌄           | on ⌄       |
| 2    | FXS  | ☑       | normal ⌄ | on ⌄  | on ⌄          | off ⌄        | off ⌄           | on ⌄       |
| 3    | FXS  | ☐       | normal ⌄ | off ⌄ | on ⌄          | off ⌄        | off ⌄           | on ⌄       |
| 4    | FXS  | ☐       | normal ⌄ | off ⌄ | on ⌄          | off ⌄        | off ⌄           | on ⌄       |

⊘ Submit

FXS Port Hardware Profiles

| Delete | Profile ID | Line Reversal | Hookflash Debounce Time | Hookflash Time | Impedance | DTMF Dial-Out Delay | Visual Message-Waiting Indication | Loop Current Break | Loop Current Time |
|--------|-----------|---------------|------------------------|----------------|-----------|---------------------|-----------------------------------|--------------------|-------------------|
|        |           |               |                        |                |           |                     |                                   |                    |                   |
| ☐      | 1         | ☐             | 75                     | 500            | 600R ⌄    | 500                 | tone ⌄                            | ☑                  | 300               |

| Pulse Dial Encoding | Pulse Dial Detection Parameters | | |
|---------------------|--------------------------------|---|---|
|                     | Pulse Min Break Time | Pulse Max Break Time | Pulse Min Make Time |
| normal ⌄            | 40                   | 70                   | 30                  |

⊘ Submit   ⊕ Add   ⊗ Delete

/ Configuration / Expert Config / POTS / Port 1

⊟ Collapse All

Interfaces For This Port

| ID | Interface | DN | Username | Ring Profile | Interface Profile |
|---|---|---|---|---|---|
| 1 | 0101 | | | 1 - External_USA ⌄ | 1 - FXS_ports_profile ⌄ |

⊘ Submit  ⊕ Add  ⊗ Delete

⊟ Interfaces Profile

| Profile ID | Profile Name | Caller ID type | Caller ID wait | Caller ID Time | DTMF dial digit | DTMF dial timeout | Line busy cause |
|---|---|---|---|---|---|---|---|
| 1 | FXS_ports_profile | gr30-mdmf ⌄ | 6000 | DST ⌄ | # | 5 | 17 |
| 2 | FXO_ports_profile | gr30-mdmf ⌄ | 6000 | DST ⌄ | # | 5 | 34 |

⊘ Submit  ⊕ Add  ⊗ Delete

⊟ FXS Ring Profiles

| Delete | ID | Name | Frequency | Repeat | Ring1 On | Ring1 Off | Ring2 On | Ring2 Off | Ring3 On | Ring3 Off |
|---|---|---|---|---|---|---|---|---|---|---|
| ☐ | 1 | External_USA | 20 | ☑ | 2000 | 4000 | 0 | 0 | 0 | 0 |
| ☐ | 2 | Internal | 25 | ☐ | 2000 | 4000 | 2000 | 4000 | 0 | 500 |
| ☐ | 3 | bellcore-r1 | 20 | ☑ | 400 | 400 | 900 | 400 | 400 | 3500 |

⊘ Submit  ⊕ Add  ⊗ Delete

FIG. 2D

⬅ / Configuration / Expert Config / POTS / Port 2

☐ Collapse All

Interfaces For This Port

| ID | Interface | DN | Username | Ring Profile | Interface Profile |
|---|---|---|---|---|---|
| 1 | 0102 | | | 1 - External_USA ⌄ | 1 - FXS_ports_profile ⌄ |

⊘ Submit    ⊕ Add    ⊗ Delete

☐ Interfaces Profile

| Profile ID | Profile Name | Caller ID type | Caller ID wait | Caller ID Time | DTMF dial digit | DTMF dial timeout | Line busy cause |
|---|---|---|---|---|---|---|---|
| 1 | FXS_ports_profile | gr30-mdmf ⌄ | 6000 | DST ⌄ | # | 5 | 17 |
| 2 | FXO_ports_profile | gr30-mdmf ⌄ | 6000 | DST ⌄ | # | 5 | 34 |

⊘ Submit    ⊕ Add    ⊗ Delete

☐ FXS Ring Profiles

| Delete | ID | Name | Frequency | Repeat | Ring1 On | Ring1 Off | Ring2 On | Ring2 Off | Ring3 On | Ring3 Off |
|---|---|---|---|---|---|---|---|---|---|---|
| ☐ | 1 | External_USA | 20 | ☑ | 2000 | 4000 | 0 | 0 | 0 | 0 |
| ☐ | 2 | Internal | 25 | ☐ | 2000 | 4000 | 2000 | 4000 | 0 | 500 |
| ☐ | 3 | bellcore-r1 | 20 | ☑ | 400 | 400 | 900 | 400 | 400 | 3500 |

⊘ Submit    ⊕ Add    ⊗ Delete

FIG. 2E

← / Configuration / Expert Config / Dial Plan

□ Collapse All

Profiles

| Delete | ID | Name | Enabled | Modify |
|---|---|---|---|---|
| □ | 1 | new_profile | □ | ✎ |
| □ | 20 | To_SIP | ☑ | ✎ |
| □ | 34 | To_FXS | ☑ | ✎ |

⊕ Add  ⊗ Delete

⊘ Submit

□ Planner Groups

| Delete | ID | Name | Cause Codes | Active Times | Priority |
|---|---|---|---|---|---|
| □ | 1 | default | 0 | 0000-2359 | □ |
| □ | 99 | Re-Presentation | 3,17,38,41 | 0000-2359 | □ |

⊕ Add  ⊗ Delete

⊘ Submit

□ Call Presentation Groups

| Delete | ID | Name | Enable | Interface | Seq. Mode | Dest. Timeout | Dest. Timeout Action | Max Dest. Attempts | Cause |
|---|---|---|---|---|---|---|---|---|---|
| □ | 1 | default | □ | 1001 | round_robin ▾ | 180 | try_next_dest ▾ | 8 | 17 |
|  |  |  | Destinations | IF:0101\|IF:0102\|IF:0103\|IF:0104\|IF:0105\|IF:0106\|IF:0107\|IF:0108 | | | | | |

⊕ Add  ⊗ Delete

⊘ Submit

□ Overlap Dialing
Enabled [OFF]
SIP Overlap Dialing
Enable Tx [ON]

⇐ / Configuration / Expert Config / Dial Plan / Profile 20

Plans in this profile

| Delete | Plan ID | Name  | Source         | Destination     | Cost | Group    |
|--------|---------|-------|----------------|-----------------|------|----------|
| ☐      | 1       | To_SIP| IF:0[1]..,TEL:<,*> | IF:9901,TEL:<1> | 0 ˅ | 0 - None ˅ |

⊕ Add   ⊗ Delete

⊘ Submit

FIG. 2H

⇐ / Configuration / Expert Config / Dial Plan / Profile 24

Plans in this profile

| Delete | Plan ID | Name   | Source        | Destination | Cost | Group                  |
|--------|---------|--------|---------------|-------------|------|------------------------|
| ☐      | 1       | FXS_01 | IF:99..,TEL:  | IF:0101     | 0 ˅ | 99 - Re-Presentation ˅ |
| ☐      | 2       | FXS_02 | IF:99..,TEL:  | IF:0102     | 0 ˅ | 99 - Re-Presentation ˅ |

⊕ Add   ⊗ Delete

⊘ Submit

/ Configuration / Expert Config / Media

⊟ Collapse All

Media Capability Sets

| Capability Set | Name | Capability Indices | Profile Mode | Modify |
|---|---|---|---|---|
| 1 | voice | 1,2,3 | VoiceOnly | ▣ |
| 2 | voice+t38Udp | 4,3,2,1,5,6,7 | VoiceOnly | ▣ |
| 3 | g711faxmodem | 3 | DataOnly | ▣ |

⊕ Add  ⊗ Delete

Media Capability

| Capability | Codec | Packet Profile | Packet Time | Modify |
|---|---|---|---|---|
| 1 | g7231 | 2 | 30 | ▣ |
| 2 | g711Alaw64k | 1 | 30 | ▣ |
| 3 | g711Ulaw64k | 1 | 20 | ▣ |
| 4 | g729 | 2 | 40 | ▣ |
| 5 | t38udp | 1 | 30 | ▣ |
| 6 | cn | 1 | 30 | ▣ |
| 7 | octet | 2 | 20 | ▣ |

⊕ Add  ⊗ Delete

⊟ Packet Profiles

Packet Profile 1

| Silence Suppression | Echo Canceller | Out of Band DTMF | Adaptive Playout Mode | Voice | | | Data | RX Gain | TX Gain | Modify |
| | | | | Nominal Playout Delay | Max Playout Delay | Initial Playout Delay | | | | |
|---|---|---|---|---|---|---|---|---|---|---|
| disable | disable | off | silence | 1 | 5 | 2 | | 0 | 0 | ▣ |

FIG. 21

/ Configuration / Expert Config / Media

| Nominal Playout Delay | | Max Playout Delay | | Modify |
|---|---|---|---|---|
| 2 | | 4 | | |

| G.726 Bit rate | G.723.1 Bit rate | OCTET RTP payload type | RTCP | Modify |
|---|---|---|---|---|
| 32 | 6.3 | 98 | disable | |

| Nominal Playout Delay | Max Playout Delay | Initial Playout Delay | Rx Gain | Tx Gain | Modify |
|---|---|---|---|---|---|
| 0 | 4 | 2 | 0 | 0 | |

| Nominal Playout Delay | | Max Playout Delay | | Modify |
|---|---|---|---|---|
| 2 | | 4 | | |

| G.723.1 Bit rate | OCTET RTP payload type | RTCP | Modify |
|---|---|---|---|
| 6.3 | 98 | disable | |

| Silence Threshold | Idle Noise Level | Noise Reduction | Noise Reduction dB | Noise Reduction Bleaching | DTMF Filter | Modify |
|---|---|---|---|---|---|---|
| -40 | -50 | disable | 12 | disable | | |

| Dynamic Update Frequency | Dynamic Update Private Subnet List Index | Modify |
|---|---|---|
| 0 | 0 | |

Capability Set 2

/ Configuration / Expert Config / Media / Capability Set 2

Name: voice+t38Udp
Capabilities Indices: 4,3,2,1,5,6,7
Profile Mode: VoiceOnly ⊙ Submit

FIG. 2L

Capability Set 3

/ Configuration / Expert Config / Media / Capability Set 3

Name: g711faxmodem
Capabilities Indices: 3
Profile Mode: DataOnly

⊙ Submit

FIG. 2M

◁ / Configuration / Expert Config / Media / Capability 4

Media Capability 4

Codec: g729

Packet Profile: 2

Packet Time: 40

⊙ Submit

/ Configuration / Expert Config / Media / Capability 6

Media Capability 6

Codec: cn

Packet Profile: 1

Packet Time: 30

⊙ Submit

FIG. 2S

/ Configuration / Expert Config / Tones

⊡ Collapse All

Tones

| | |
|---|---|
| Dialtone Sequence | 1 - USA_dial_seq ⌄ |
| Message Waiting Sequence | 2 - USA_stutter_dial_seq ⌄ |
| Busytone Sequence | 3 - USA_busy_seq ⌄ |
| Fastbusy Sequence | 4 - USA_fastbusy_seq ⌄ |
| Ringback Sequence | 5 - USA_ringing_seq ⌄ |
| Callwait1 Sequence | 6 - USA_callwait1_seq ⌄ |
| Callwait2 Sequence | 7 - USA_callwait2_seq ⌄ |
| Suspended Sequence | 8 - USA_suspend_seq ⌄ |
| Forwarded Sequence | 51 - forwarding_seq ⌄ |

⊘ Submit

⊡ Tones Definitions

| Delete | ID | Name | Freq1 | Amp1 | Freq2 | Amp2 | On Time | Off Time | Repeat | Modify |
|---|---|---|---|---|---|---|---|---|---|---|
| ☐ | 1 | USA_dialtone | 350 | 6000 | 440 | 6000 | 0 | 0 | 1 | ✎ |
| ☐ | 2 | USA_stutter_dialtone | 350 | 6000 | 440 | 6000 | 100 | 100 | 1 | ✎ |
| ☐ | 3 | USA_busy | 480 | 5000 | 620 | 5000 | 500 | 500 | 1 | ✎ |

FIG. 2U

| | | (A) | | | | | | |
|---|---|---|---|---|---|---|---|---|
| 4 | USA_fastbusy | 480 | 5000 | 620 | 5000 | 300 | 300 | 1 | 🗔 |
| 5 | USA_ringing | 480 | 5000 | 440 | 5000 | 2000 | 4000 | 1 | 🗔 |
| 6 | USA_offhook_warning | 1400 | 32000 | 2060 | 32000 | 100 | 100 | 1 | 🗔 |
| 7 | USA_callwait | 440 | 5000 | 0 | 0 | 300 | 50 | 0 | 🗔 |
| 8 | USA_suspend | 480 | 5000 | 620 | 5000 | 0 | 0 | 1 | 🗔 |
| 51 | forwarding_tone | 350 | 6000 | 440 | 6000 | 100 | 100 | 1 | 🗔 |

FIG. 2U (Continued)

/ Configuration / Expert Config / Tones

Tones Definitions

| Delete | ID | Name | Freq1 | Amp1 | Freq2 | Amp2 | On Time | Off Time | Repeat | Modify |
|---|---|---|---|---|---|---|---|---|---|---|
| ☐ | 1 | USA_dialtone | 350 | 6000 | 440 | 6000 | 0 | 0 | 1 | ▣ |
| ☐ | 2 | USA_stutter_dialtone | 350 | 6000 | 440 | 6000 | 100 | 100 | 1 | ▣ |
| ☐ | 3 | USA_busy | 480 | 5000 | 620 | 5000 | 500 | 500 | 1 | ▣ |
| ☐ | 4 | USA_fastbusy | 480 | 5000 | 620 | 5000 | 300 | 300 | 1 | ▣ |
| ☐ | 5 | USA_ringing | 480 | 5000 | 440 | 5000 | 2000 | 4000 | 1 | ▣ |
| ☐ | 6 | USA_offhook_warning | 1400 | 32000 | 2060 | 32000 | 100 | 100 | 0 | ▣ |
| ☐ | 7 | USA_callwait | 440 | 5000 | 0 | 0 | 300 | 50 | 1 | ▣ |
| ☐ | 8 | USA_suspend | 480 | 5000 | 620 | 5000 | 0 | 0 | 1 | ▣ |
| | 51 | forwarding_tone | 350 | 6000 | 440 | 6000 | 100 | 100 | 1 | ▣ |

⊕ Add  ⊗ Delete

Sequences

| Delete | Seq ID | Name | Repeat | Tones | Modify |
|---|---|---|---|---|---|
| ☐ | 1 | USA_dialtone_seq | 0 | ===> | ▣ |
| ☐ | 2 | USA_stutter_dialtone_seq | 0 | ===> | ▣ |
| ☐ | 3 | USA_busy_seq | 0 | ===> | ▣ |

/ Configuration / Expert Config / SIP Configuration

☐ Collapse All

General

Local SIP Port: 5060
Local SIP TLS Port: 5061
Accept Non-proxy Invites: OFF

⊘ Submit

SIP Profiles

| SIP Profile | Name | Interface ID | Other SIP Profile Parameters | Modify |
|---|---|---|---|---|
| 1 | profile1 | 9901 | ===> | ⬚ |

⊕ Add  ⊗ Delete

☐ Registration

| Show SIP Registration | Enable Registration | Registration Mode |
|---|---|---|
| ▤ Show Registration | ON | normal ˅ |

⊘ Submit

Additional SIP Settings

| SIP Registration Users Configuration | SIP Authentication Configuration | Namespace Configuration | SIP Music On Hold Configuration |
|---|---|---|---|
| ⚙ SIP Registration Users | ⚙ SIP Authentication | ⚙ Namespace | ⚙ SIP Music On Hold |

☐ Phone Contexts

Local Phone Contexts

Enable: ON

FIG. 2X

/ Configuration / Expert Config / SIP Configuration

Enabled
ON

| Delete | ID | Enable | Name | TON | NPI |
|---|---|---|---|---|---|
| ☐ | 1 | ☐ | local_phone.1.com | any ˅ | any ˅ |

⊘ Submit    ⊕ Add    ⊗ Delete

Remote Phone Context

Enabled
ON

| Delete | ID | Enable | Name | TON | NPI |
|---|---|---|---|---|---|
| ☐ | 1 | ☐ | remote_phone.1.com | any ˅ | any ˅ |

⊘ Submit    ⊕ Add    ⊗ Delete

- Miscellaneous

SIP Session Timers Configuration
⚙ SIP Session Timer

Miscellaneous

Default URI Scheme: sip ˅
Allow SIP URI Scheme: ☐
Use T38 AnnexE: ☐
Accept T38 AnnexE: ☐
Fax Detect: terminating ˅
Enable Modem: ☐
Modem Detect: terminating ˅
Media Control Profile: 0

FIG. 2Y

↶ / Configuration / Expert Config / SIP Configuration

⊘ Submit

⊕ Add   ⊗ Delete

□ Miscellaneous

SIP Session Timers Configuration

⚙ SIP Session Timer

Miscellaneous

| | |
|---|---|
| Default URI Scheme | sip ⌄ |
| Allow SIP URI Scheme | ☐ |
| Use T38 AnnexE | ☐ |
| Accept T38 AnnexE | terminating ⌄ |
| Fax Detect | ☐ |
| Enable Modem | terminating ⌄ |
| Modem Detect | 0 |
| Media Control Profile | none |
| Signalling Application ID | 2000 |
| T1 Retry Timer Increment (ms) | 4000 |
| T2 Retry Timer Limit (ms) | 60 |
| Maximum Calls | udp ⌄ |
| SIP Signal Transport | |

⊘ Submit

Advanced Settings

| SIP Response-Q.931 Cause Mapping Configuration | Q.931 Cause-SIP Response Mapping Configuration | Advanced SIP Configuration |
|---|---|---|
| ⚙ SIP Response-Q.931 Cause Mapping | ⚙ Q.931 Cause-SIP Response Mapping | ⚙ Advanced SIP |

FIG. 2Z

/ Configuration / Expert Config / SIP / SIP Profile 1

SIP Profile 1 Configuration 1

| | |
|---|---|
| Name | profile1 |
| Interface ID | 9901 |
| Local Domain | mymtm.us |
| Alternative Local Domain | mymtm.us |
| From Header 'userinfo' | Calling Party ⌄ |
| Contact Header 'userinfo' | Authentication Username ⌄ |
| P Header 'userinfo' | Authentication Username ⌄ |
| From Header 'host' | Local Domain ⌄ |
| To Header 'host' | Local Domain ⌄ |
| Redirection 'host' | Local Domain ⌄ |
| Transport | tcp ⌄ |
| Capability Set | 3 - g711faxmodem ⌄ |
| Reliable Provisional Responses | ⦿ off ○ supported ○ require |
| DTMF Transport | ⦿ rfc2833 ○ info ○ rfc2833 and tx info ○ rfc2833 and rx info ○ off |
| DTMF INFO | ⦿ mode1 ○ mode2 |
| RFC2833 payload (96-127) | 101 |
| Call Admission Control | ○ enable ⦿ disable |
| Max Inbound calls | 120 |
| Max Outbound calls | 120 |
| CAC cause code | 503 |

FIG. 2AA

/ Configuration / Expert Config / SIP / SIP Profile 1

SIP Profile 1 Proxy Parameters 1

| | |
|---|---|
| Request-URI Port | 5060 |
| Minimum Valid SIP Response | 180 |
| Proxy Mode | ○ normal  ○ cyclic  ● dnssrv |
| Timeout (ms) | 5000 |
| Proxy Retry Delay (s) | 0 |
| Accessibility Check | ● off  ○ options  ○ bye |
| Accessibility Check Interval (s) | 30 |
| Accessibility Check Transport | tcp ∨ |

⊘ Submit

SIP Profile 1 Proxies

| SIP Proxy | Enable | IP/DNS Name | Port | TLS Port | Modify |
|---|---|---|---|---|---|
| 1 | 1 | | 5060 | 5061 | ▢ |

⊕ Add  ⊗ Delete

SIP Profile 1 Registration Parameters 1

| | |
|---|---|
| Registration Request-URI Port | 5060 |
| Registration Expiry Time (s) | 600 |
| Max Numbers of Registrars | 3 |
| Minimum Valid SIP Response | 200 |
| Registration Mode | ○ normal  ● dnssrv |
| Timeout (ms) | 5000 |
| Registrar Retry Delay (s) | 0 |

FIG. 2AB

/ Configuration / Expert Config / SIP / SIP Profile 1

⊘ Submit

SIP Profile 1 Proxies

| SIP Proxy | Enable | IP/DNS Name | Port | TLS Port | Modify |
|---|---|---|---|---|---|
| 1 | 1 | | 5060 | 5061 | ✎ |

⊕ Add   ⊗ Delete

SIP Profile 1 Registration Parameters 1

| | |
|---|---|
| Registration Request-URI Port | 5060 |
| Registration Expiry Time (s) | 600 |
| Max Numbers of Registrars | 3 |
| Minimum Valid SIP Response | 200 |
| Registration Mode | ○ normal  ● dnssrv |
| Timeout (ms) | 5000 |
| Registrar Retry Delay (s) | 0 |
| Accessibility Check | ● off  ○ options  ○ bye |
| Accessibility Check Interval (s) | 30 |
| Accessibility Check Transport | tcp ⌄ |

⊘ Submit

SIP Profile 1 Registrar

| SIP Registrar | Enable | IP/DNS Name | Port | TLS Port | Modify |
|---|---|---|---|---|---|
| 1 | 1 | | 5060 | 5061 | ✎ |

⊕ Add   ⊗ Delete

FIG. 2AC

⇦ / Configuration / Expert Config / SIP / Registration

SIP Registration Users

| Delete | User | Enable | SIP Profile | Dn | Username | Authentication User Index | Modify |
|--------|------|--------|-------------|----|----------|---------------------------|--------|
| ☐ | 1 | 1 | profile1 | | | | 🖉 |
| ☐ | 2 | 1 | profile1 | | | | 🖉 |

⊕ Add　⊗ Delete

| / Configuration / Expert Config / SIP / Authentication |

SIP Authentication Users

| Delete | User | Enable | SIP Profile | Username | Password | Subscriber | Resource Priority | Modify |
|--------|------|--------|-------------|----------|----------|------------|-------------------|--------|
| ☐ | 1 | 1 | profile1 | | **** | IF:0101 | N/A (no namespace selected) | 🖉 |
| ☐ | 2 | 1 | profile1 | | **** | IF:0102 | N/A (no namespace selected) | 🖉 |
| ☐ | 3 | 1 | profile1 | | **** | IF:0103 | N/A (no namespace selected) | 🖉 |

⊕ Add   ⊗ Delete

FIG. 2AE

Namespaces

Selected Namespace: off ▾  ⊘ Submit

| NameSpace | Name | Priorities | Type / Modify |
|---|---|---|---|
| 1 | dsn | routine,priority,immediate,flash,flash-override | fixed |
| 2 | drsn | routine,priority,immediate,flash,flash-override,flash-override-override | fixed |
| 3 | q735 | 4,3,2,1,0 | fixed |

⊕ Add   ⊗ Delete

/ Configuration / Expert Config / SIP / Namespaces

/ Configuration / Expert Config / SIP / SIP Advanced Configuration

Advanced SIP Parameters

| Parameter | Value |
|---|---|
| BYE-Also INVITE to proxy | OFF |
| REFER INVITE to proxy | OFF |
| 3xx INVITE to proxy | OFF |
| User-Agent header | 1 |
| User-Agent header ext | NULL |
| Maximum SIP forking | 3 |
| Redirected INVITE's preserve to Header | ON |
| Refer-to header target | Contact ⌄ |
| Use Request-URI in call dialog matching | ON |
| 183 Session Progress if media present. If =2, send 183 instead of 180 with sdp | 2 |
| Disconnect if Progress with Cause received | OFF |
| Disconnect with Progress | 0 |
| Early OK timer (0=off) | 0 |
| Restricted User Display Name | Anonymous |
| Use maddr in Contact header | OFF |
| Outgoing Call Setup Timeout | 15000 |
| To header URI parameters | NULL |
| From header URI parameters | NULL |
| Privacy Standard | RFC 3323 |
| P-Asserted Standard | RFC 3323 ⌄ |
| National Prefix | off |

FIG. 2AH

/ Configuration / Expert Config / SIP / SIP Advanced Configuration

| | |
|---|---|
| National Prefix | off |
| International Prefix | off |
| Source of TEL | Request-URI ∨ |
| OLI CPC settings | |
| Value of cpc | NULL |
| Use Cisco format cpc | OFF |
| ANI Information Digits (II) | 0 |
| Media Control | |
| T38 to use audio port | OFF |
| SDP control | |
| Codec Selection Preference | remote ∨ |
| Clear Channel Codec Mode | rfc4040 ∨ |
| Single media description in T38 INVITE | ON |
| Connection information in session description only | ON |
| Packet Time Mode Selection | off ∨ |
| Enable Max Packet Time Parameter | OFF |
| SDP Offer 0.0.0.0 when initiating hold | OFF |
| SDP Answer 0.0.0.0 when put on hold | OFF |
| Use FQDN | OFF |
| Enable Silence Suppression Parameter | OFF |
| Enable Echo Cancellation Parameter | OFF |
| Allow annexb Parameter | ON |
| SIP User to User messages | |

FIG. 2AI

← / Configuration / Expert Config / SIP Proxy Configuration

☐ Collapse All

SIP Proxy Configuration

| | |
|---|---|
| Mode | off ⌄ |
| Realm | abcdefghijwhatever.com |
| Rx Port | 6060 |

⊘ Submit

SIP Proxy Registered Users

No Registered Users

☐ SIP Proxy Auth Users

| | |
|---|---|
| Use Aliases | if_itsp_down ⌄ |

| Delete | User ID | Enabled | Username | Aliases | Password |
|---|---|---|---|---|---|
| ☐ | 1 | ☐ | user | NULL | **** |

⊘ Submit  ⊕ Add  ⊗ Delete

☐ SIP Proxy IP Filters

Ignored IP Addresses

| Delete | ID | Enabled | ipmin | ipmax |
|---|---|---|---|---|
| ☐ | 1 | ☐ | 0.0.0.0 | 0.0.0.0 |

⊘ Submit  ⊕ Add  ⊗ Delete

Rejected IP Addresses

| Delete | ID | Enabled | ipmin | ipmax |
|---|---|---|---|---|
| ☐ | 1 | ☐ | 0.0.0.0 | 0.0.0.0 |

FIG. 2AK

/ Configuration / Expert Config / SIP Proxy Configuration

Rejected IP Addresses

| Delete | ID | Enabled | ipmin | ipmax |
|---|---|---|---|---|
| ☐ | 1 | ☐ | 0.0.0.0 | 0.0.0.0 |

⊘ Submit | ⊕ Add | ⊗ Delete

Trusted IP Addresses

| Delete | ID | Enabled | ipmin | ipmax |
|---|---|---|---|---|
| ☐ | 1 | ☐ | 0.0.0.0 | 0.0.0.0 |

⊘ Submit | ⊕ Add | ⊗ Delete

SIP ITSP Proxies

| Mode | normal ˅ |
|---|---|
| Proxy Test | options ˅ |
| Test Interval (s) | 30 |
| Transport | udp ˅ |

| Delete | ID | Enabled | IP/Host | Port | TLS Port |
|---|---|---|---|---|---|
| ☐ | 1 | ☐ | 0.0.0.0 | 5060 | 5061 |

⊘ Submit | ⊕ Add | ⊗ Delete (A)

FIG. 2AL

△ / Configuration / Expert Config / SIP Proxy Configuration

Trunk Gateways ⓘ Help

SIP Messages from Trunk Gateway: [trust ˅]
Allow Calls from ITSP Proxy to PSTN: [never ˅]
Transport: [udp ˅]
Mode: [normal ˅]
Test: [options ˅]
Test Interval (s): [30]

| Delete | Gateway ID | Enabled | Is PSTN Gateway? | IP/Host | Port | TLS Port |
|---|---|---|---|---|---|---|
| ☐ | 1 | ☑ | ☐ | Trunk Gateway at 127.0.0.1 | -- | -- |
| ☐ | 2 | ☐ | ☐ | 0.0.0.0 | 5060 | 5061 |

⊖ Submit  ⊕ Add  ⊗ Delete

Trunk Gateway Call Routing ⓘ Help

| Delete | ID | Enabled | Description | Call Attributes | Trunk Gateway ID List | Routing Rule | Redirection Responses |
|---|---|---|---|---|---|---|---|
| ☐ | 1 | ☐ | emergency | TEL:911 | 1 | linear_up | 500-599 |

⊖ Submit  ⊕ Add  ⊗ Delete

PSTN Gateway Fallback ⓘ Help

| Trunk Gateway ID List | Routing Rule | Redirection Responses |
|---|---|---|
| all | linear_up | 500-599 |

[Submit]

FIG. 2AM

/ Configuration / Expert Config / Supplementary Services Configuration

Supplementary Services Parameters

Enable: ON

⊙ Submit

Supplementary Services Profiles

| Supplementary Services Profile | Call Waiting Mode | Call Conference Mode | Call Waiting Hangup Action | Transfer On Hangup | Recall | Blind Transfer Code | Consultative Transfer Code | DND Enable Code | DND Disable Code |
|---|---|---|---|---|---|---|---|---|---|
| 1 | With Command Mode | With Command Mode | Hangup All | On | ! | *98* | *99 | *78 | *79 |

SIP "Do Not Disturb"

"Do Not Disturb" Status Code: 480
"Do Not Disturb" Status Text: Do Not Disturb

⊙ Submit

SIP "Call Waiting"

"Call Waiting" Status Code: off ∨
"Call Waiting" Status Text: NULL

⊙ Submit

Supplementary Services Users

| Port ID | Type | Enabled | Call Waiting | DND Enable |
|---|---|---|---|---|
| All |  | - ∨ | - ∨ | - ∨ |
| 1 | FXS | ☑ | off ∨ | on ∨ |

FIG. 2AN

| Call Cycle Code | Call Clear Code | Call Conference Code | Call Forward Unconditional Enable Code | Call Forward Unconditional Disable Code | Call Forward Busy Enable Code | Call Forward Busy Disable Code | Call Forward No Answer Enable Code | Call Forward No Answer Disable Code | Disable All Code |
|---|---|---|---|---|---|---|---|---|---|
| -- | *52 | *54 | *72 | *73 | *90 | *91 | *92 | *93 | *00 |

| DND Response | DND Off-Hook Deactivate | Call Forward Enable |
|---|---|---|
| -- ⌄ | -- ⌄ | -- ⌄ |
| instant_reject ⌄ | off ⌄ | on ⌄ |

FIG. 2AN (Continued)

△ / Configuration / Expert Config / Supplementary Services Configuration

"Do Not Disturb" Status Text | Do Not Disturb

⊙ Submit

SIP "Call Waiting"

"Call Waiting" Status Code | off ∨
"Call Waiting" Status Text | NULL

⊙ Submit

Supplementary Services Users

| Port ID | Type | Enabled | Call Waiting | DND Enable | DND Response | DND Off-Hook Deactivate | Call Forward Enable |
|---|---|---|---|---|---|---|---|
| All | FXS | -- ∨ | -- ∨ | -- ∨ | -- ∨ | -- ∨ | -- ∨ |
| 1 | FXS | ☑ | off ∨ | on ∨ | instant_reject ∨ | off ∨ | on ∨ |
| 2 | FXS | ☑ | off ∨ | on ∨ | instant_reject ∨ | off ∨ | on ∨ |
| 3 | FXS | ☐ | off ∨ | on ∨ | instant_reject ∨ | off ∨ | on ∨ |
| 4 | FXS | ☐ | off ∨ | on ∨ | instant_reject ∨ | off ∨ | on ∨ |

⊙ Submit

Supplementary Services Status

⟳ Refresh Status

| Port ID | Do Not Disturb | Call Forward Destination | Call Forward Unconditional | Call Forward Busy | Call Forward No Answer |
|---|---|---|---|---|---|
| 1 | 0 | -- | 0 | 0 | 0 |
| 2 | 0 | -- | 0 | 0 | 0 |
| 3 | 0 | -- | 0 | 0 | 0 |
| 4 | 0 | | | | |

FIG. 2AO

⌂ / Configuration / Expert Config / Advanced

⊞ Expand All

Blocking

Blocking

Blocking Cause Code

[ 34 ]

LAN Parameters

RTP Checksum

[ ON ]

⊘ Submit

⊞ Temperature Alert Action

Cause Codes

▦ Show Cause Mapping

Boot Manager

✎ Change Active Boot Partition

⊞ Banner

⊞ Console Parameters

Additional Settings

| Advanced Media Configuration | Advanced T38 Configuration |
|---|---|
| ⚙ Advanced Media | ⚙ Advanced T38 |

FIG. 2AP inhand InHand Networks

| System | Network | Services | Firewall | QoS | VPN | Tools | Application | Status |

Dialup

| Field | Value |
|---|---|
| Enable | ☑ |
| Time schedule | ALL ▾ Schedule Management |
| Shared Connection(NAT) | ☑ |
| Default Route | ☑ |
| Network Provider | Custom ▾ Manage |
| APN | |
| Access Number | |
| Username | |
| Password | |
| Network Select Type | Auto ▾ |
| Connection Mode | Always Online ▾ |
| Redial Interval | 30 Seconds |
| Show Advanced Options | ☑ |
|     Initial Commands | AT |
|     Binding ICCID | |
|     PIN Code | |
|     Static MTU | ☑ |
|     MTU | 1500 |
|     Sim Card Operator | Auto ▾ |
|     Authentication Type | Auto ▾ |
|     Use Peer DNS | ☑ |
|     Link Detection Interval | 55 Seconds(0: disable) |
|     Debug | ☐ |
|     Debug Modem | ☐ |
|     ICMP Detection Mode | Ignore Traffic ▾ |
|     ICMP Detection Server | 208.67.220.220 |
|     ICMP Detection Interval | 300 Seconds |
|     ICMP Detection Timeout | 20 Seconds |
|     ICMP Detection Retries | 5 |

[ Apply ] [ Cancel ]

FIG. 3A inhand InHand Networks

| System | Network | Services | Firewall | QoS | VPN | Tools | Application | Status |

Link Backups

| | |
|---|---|
| Enable | ☑ |
| Main Link | WAN ⌄ |
|     ICMP Detection Server | |
|     ICMP Detection Interval | 5    Seconds |
|     ICMP Detection Timeout | 3    Seconds |
|     ICMP Detection Retries | 5 |
| Backup Link | Dialup ⌄ |
| Backup Mode | Hot Backup ⌄ |

[ Apply ] [ Cancel ]

FIG. 3B inhand InHand Networks

| System | Network | Services | Firewall | QoS | VPN | Tools | Application | Status |

LAN

| | |
|---|---|
| Type | Static IP ⌄ |
| MAC Address | 00:18:05:12:1A:77   [ Default ] |
| IP Address | |
| Netmask | 255.255.255.0 |
| MTU | Default ⌄ 1500 |
| LAN Mode | Auto Negotiation ⌄ |

Multi-IP Settings

| IP Address | Netmask | Description |
|---|---|---|
| | | |

[ Add ]

LAN Port Enable

| | |
|---|---|
| port1 | ☑ |
| port2 | ☑ |
| port3 | ☑ |
| port4 | ☑ |

[ Apply ] [ Cancel ]

FIG. 3C inhand InHand Networks

| System | Network | Services | Firewall | QoS | VPN | Tools | Application | Status |

IP Passthrough

Enable IP Passthrough ☐

[Apply] [Cancel]

FIG. 3D inhand InHand Networks

| System | Network | Services | Firewall | QoS | VPN | Tools | Application | Status |

DHCP Service

Enable DHCP ☑
- IP Pool Starting Address [          ]
- IP Pool Starting Address [          ]
- Lease [60] Minutes
- DNS [208.67.222.222 , 8.8.8.8 , 192.168.3.1] Edit
- Windows Name Server (WINS) [0.0.0.0]
- Domain Option ☑
  [inhand-router.com]

Static DHCP

| MAC Address | IP Address | Host | ⇧ |
|---|---|---|---|
| 00:00:00:00:00:00 | | | |
| | | | Add |

[Apply] [Cancel]

FIG. 3E inhand InHand Networks

| System | Network | Services | Firewall | QoS | VPN | Tools | Application | Status |

Device Manager

| | |
|---|---|
| Enable | ☑ |
| Service Type | Device Manager ▽ |
| Server | iot.inhandnetworks.com ▽ |
| Secure Channel | ☐ |
| Registered Account | |
| Site Name | |
| LBS info Upload Interval | 1  Hours |
| Series info Upload Interval | 1  Hours |
| Channel Keepalive | 30  Seconds |

[ Apply ] [ Cancel ]

FIG. 3F inhand InHand Networks

| System | Network | Services | Firewall | QoS | VPN | Tools | Application | Status |

Traffic Manager

| | |
|---|---|
| Enable | ☑ |
| Start Day | 1 ▽ |
| Monthly Threshold | 0  MB ▽ |
| When Over Monthly Threshold | Block Except Management ▽ |
| Alarm Threshold | 0  MB/Month |
| Last 24-Hours Threshold | 0  KB ▽ |
| When over 24-Hours Threshold | Block Except Management ▽ |
| Advanced | ☐ |

[ Apply ] [ Cancel ]

FIG. 3G inhand InHand Networks

| System | Network | Services | Firewall | QoS | VPN | Tools | Application | Status |

Basic

| Default Filter Policy | Accept ⌄ |
| Block Anonymous WAN Requests (ping) | ☐ |
| Filter Multicast | ☑ |
| Defend DoS Attack | ☑ |

Apply  Cancel

FIG. 3H inhand InHand Networks

| System | Network | Services | Firewall | QoS | VPN | Tools | Application | Status |

Filtering

| Enable | Proto | Source | Source Port | Destination | Destination Port | Action | Log | Description |
|---|---|---|---|---|---|---|---|---|
| ☑ | ALL ⌄ | 0.0.0.0/0 | | | | Accept ⌄ | ☐ | |

Add

Apply  Cancel

FIG. 3I inhand InHand Networks

| System | Network | Services | Firewall | QoS | VPN | Tools | Application | Status |

Content Filtering

| Enable | URL | Action | Log | Description |
|---|---|---|---|---|
| ☑ | | Accept ▼ | ☐ | |

Add

[Apply] [Cancel]

FIG. 3J inhand InHand Networks

| System | Network | Services | Firewall | QoS | VPN | Tools | Application | Status |

IPSec Settings

Enable NAT-Traversal (NATT) ☑
Keep alive time interval of NATT  60  Seconds
Enable Compression ☑
Debug ☐
Force NATT ☐
Dynamic NATT Port ☐

[Apply] [Cancel]

FIG. 3K (A)

| RS-485 | ZLAN6002A | IR615 |
|---|---|---|
| 485A | 485A | A |
| 485B | 485B | B |

| AC cord | PSI |
|---|---|
| Outlet | PSI |
| Outlet | AC input |

| 12Vwires | PSI | ZLAN6002A | IR615 |
|---|---|---|---|
| 12V + | PSI +12 VDC | 24V+ | V+ |
| 12V - | PSI Ground | GND | V- |

| IO wires | PSI | ZLAN 6002A |
|---|---|---|
| AlarmReturn/Common | PIN 3 (AlarmReturn) | COM |
| Low Battery | PIN 4(LowBattery) | DI 1 |
| On Battery | PIN 5(OnBattery) | DI 2 |
| Battery Missing | PIN 6(BatteryMissing) | DI 3 |
| Replace Battery | PIN 7(ReplaceBattery) | DI 4 |

FIG. 4B (Continued)

Step 1. Go to System->Serial Port. Change setting as 9600 8 None 1, and Apply
Step 2. Go to System->Admin Access. Uncheck the Console, and Apply
Step 3. Go to Services->DTU. Enable it and then select Modbus-Net-Bridge on DTU Protocol, leave the reset in default. And Apply.

Step 1

| nd Networks | | | | | | |
|---|---|---|---|---|---|---|
| Services | Firewall | QoS | VPN | Tools | Application | Status |
| DHCP Service | Your Password have security risk, please click here to | | | | | |
| DNS | Enable | ☑ | | | | |
| DNS Relay | DTU Protocol | Modbus-Net-Bridge ⌄ | | | | |
| DDNS | Protocol | TCP ⌄ | | | | |
| Device Manager | Mode | Server ⌄ | | | | |
| Device Manager Legacy | Listening Port | 502 | | | | |
| SNMP | Frame Interval | 100 mseconds | | | | |
| SNMPTRAP | | | | | | |
| DTU | Apply  Cancel | | | | | |
| SMS | | | | | | |
| Traffic Manager | | | | | | |
| Alarm Manager | | | | | | |
| User Experience Plan | | | | | | |

Ⓑ

Step 3

FIG. 4D (Continued Part 2)

- Step 1. initiate a Modbus TCP connection to IR615(Modbus Slave, port 502)
  - Please find the static IP of IR615 (via InConnect VPN)
- Step 2. send a TCP packet with payload binary: 12Bytes: 0x01 0x00 0x00 0x00 0x00 0x06 0x01 0x01 0x00 0x00 0x00 0x04
- Step 3. You will receive TCP packet with 10Bytes payload: 0x01 0x00 0x00 0x00 0x00 0x04 01 01 01 01 0B

The last byte (e.g. 0x0B) is the value of the 4 relays.
  - Bit 00 Low battery:
    - 0: low battery, 1: Good
  - Bit 01 On battery:
  - Bit 02 Battery Missing:
    - 0: Battery is missing. 1:good
  - Bit 03 Replace battery:
    - 0: Battery needs to replace
    - 1: battery is good.
  - UPS is unplugged or AC power is not present 5. Software/Portocol

ZLAN6042/ ZLAN6002A/ ZLAN6032 is designed based on Modubs TCP and Modubs RTU, the command and register defined as follow:

| Register address | No. of DI/DO/AI | Modbus command | discription | R/W |
|---|---|---|---|---|
| 00001 | 0 | 01 | No. 1 DI | Read Only |
| 00002 | 1 | 01 | No. 2 DI | Read Only |
| 00003 | 2 | 01 | No. 3 DI | Read Only |
| 00004 | 3 | 01 | No. 4 DI | Read Only |
| 000017 | 0 | 01/05 | No. 1 DO | Read /Write |
| 000018 | 1 | 01/05 | No. 2 DO | Read /Write |
| 000019 | 2 | 01/05 | No. 3 DO | Read /Write |
| 000020 | 3 | 01/05 | No. 4 DO | Read /Write |
| 30001 | 0 | 04 | No. 1 AI | Read Only |

FIG. 4E

Step 1. initiate a Modbus TCP connection to IR615(Modbus Slave, port 502)
- Please find the static IP of IR615 (via InConnect VPN)

Step 2. send Modbus Read Coil command (the function code is 0x01)
- The 4 relay Modbus variable address is
- 0x0001 Low Battery:
  - 0: low battery. 1: Good
- 0x0002 On battery:
  - UPS is unplugged or AC power is not present
- 0x0003 Battery Missing:
  - 0: Battery is missing. 1: good
- 0x0004 Replace battery:
  - 0: Battery needs to replace
  - 1: battery is good.

5. Software/Portocol
ZLAN6042/ ZLAN6002A/ ZLAN6032 is designed based on Modubs TCP and Modubs RTU, the command and register defined as follow:

| Register address | No. of DI/DO/AI | Modbus command | discription | R/W |
|---|---|---|---|---|
| 00001 | 0 | 01 | No. 1 DI | Read Only |
| 00002 | 1 | 01 | No. 2 DI | Read Only |
| 00003 | 2 | 01 | No. 3 DI | Read Only |
| 00004 | 3 | 01 | No. 4 DI | Read Only |
| 000017 | 0 | 01/05 | No. 1 DO | Read /Write |
| 000018 | 1 | 01/05 | No. 2 DO | Read /Write |
| 000019 | 2 | 01/05 | No. 3 DO | Read /Write |
| 000020 | 3 | 01/05 | No. 4 DO | Read Only |
| 30001 | 0 | 04 | No. 1 AI | Read Only |

FIG. 4F

PSI PS36L-P7

Note:
Pin 4 to Pin 7 are relay outputs.
Pin 3 is the return of relay outputs.

| 1 | 2 | 3 | 4 | 5 | 6 | 7 |
|---|---|---|---|---|---|---|
| +12 Dc Out | DC Out Return | Alarm Return | Low Battery | On Battery | Battery Missing | Replace Battery |

US 12,425,520 B2

WIRELESS ALTERNATIVE TO LOCAL ANALOG TELEPHONE SYSTEM

CROSS REFERENCE TO RELATED APPLICATIONS

This application claims benefit under 35 U.S.C. § 119 (e) of Provisional U.S. Patent Application No. 63/487,806, filed Mar. 1, 2023, the contents of which is incorporated herein by reference in its entirety.

TECHNICAL FIELD

The present disclosure relates to communication systems and more particularly to wireless communication systems and methods for using the same.

BACKGROUND

Millions of telecommunication devices, including residential and business landlines, fire alarms, security alarms, elevator lines, etc., have relied upon legacy hardwired analog connections know as Plain Old Telephone Service (POTS). In 2019, the Federal Communication Commission (FCC) released a mandate requiring telephone network providers to sunset POTS connections and permitting them to cease offering and supporting POTS connections in 2022. With many homes and businesses continuing to rely on POTS connections for telephone communications and safety systems, an alternative solution is needed.

SUMMARY

A POTS alternative including an uninterruptible power supply (UPS), a router, a modbus converter for connecting the router to the UPS to monitor conditions of the UPS, a gateway for providing connections to one or more POTS-based customer premises equipment through the modbus converter to the router and directly to the router. The router includes a SIM card configured to connect to one cellular service provider at a time among a plurality of cellular service providers. The router automatically connecting to a cellular service provider among the plurality of cellular service providers providing the strongest cellular signal and switching from the cellular service provider to a different cellular service providers when the different cellular service provider provides a stronger cellular signal when the cellular service provider no longer provides the strongest cellular signal.

BRIEF DESCRIPTION OF THE DRAWINGS

FIG. 2B is a screenshot illustrating a network configuration for a gateway in accordance with an embodiment.

FIG. 2D is a screenshot illustrating a first port for the POTS line configuration of FIG. 2C in accordance with an embodiment.

FIG. 2E is a screenshot illustrating a second port for the POTS line configuration of FIG. 2C in accordance with an embodiment.

FIG. 2F is a screenshot illustrating a dial plan configuration of a gateway in accordance with an embodiment.

FIG. 2G is a screenshot illustrating a configuration for call to SIP for a gateway in accordance with an embodiment FIG. 2H is a screenshot illustrating a configuration for calls to FXS for a gateway in accordance with an embodiment.

FIG. 2I is a screenshot illustrating a configuration for media capabilities of a gateway in accordance with an embodiment

FIG. 2L is a screenshot illustrating a media capability configuration for voice and fax features of a gateway in accordance with an embodiment FIG. 2M is a screenshot illustrating a media capability configuration for data-only features of a gateway in accordance with an embodiment.

FIG. 2S is a screenshot illustrating a media capability configuration for a profile for data for a gateway in accordance with an embodiment.

FIG. 2U is a screenshot illustrating a first part of a tone configuration for a gateway in accordance with an embodiment.

FIG. 2X is a screenshot illustrating a first part of a SIP configuration for a profile for data for a gateway in accordance with an embodiment.

FIG. 2Y is a screenshot illustrating a second part of a SIP configuration for a profile for data for a gateway in accordance with an embodiment.

FIG. 2Z is a screenshot illustrating a third part of a SIP configuration for a profile for data for a gateway in accordance with an embodiment.

FIG. 2AA is a screenshot illustrating a SIP profile configuration for a gateway in accordance with an embodiment.

FIG. 2AB is a screenshot further illustrating the SIP profile of FIG. 2AA.

FIG. 2AC is a screenshot further illustrating the SIP profile of FIG. 2AB.

FIG. 2AD is a screenshot illustrating a SIP registration configuration for a gateway in accordance with an embodiment.

FIG. 2AE is a screenshot illustrating a SIP authentication configuration for a gateway in accordance with an embodiment.

FIG. 2AF is a screenshot illustrating a SIP namespace configuration for a gateway in accordance with an embodiment.

FIG. 2AG is a screenshot illustrating a SIP music on hold configuration for a gateway in accordance with an embodiment.

FIG. 2AH is a screenshot illustrating a SIP advanced configuration for a gateway in accordance with an embodiment.

FIG. 2AI is a screenshot further illustrating the SIP advanced configuration of FIG. 2AH.

FIG. 2AJ is a screenshot further illustrating the SIP advanced configuration of FIG. 2AI.

FIG. 2AK is a screenshot illustrating a SIP proxy configuration for a gateway in accordance with an embodiment.

FIG. 2AL is a screenshot further illustrating the SIP advanced configuration of FIG. 2AK.

FIG. 2AM is a screenshot further illustrating the SIP advanced configuration of FIG. 2AL.

FIG. 2AN is a screenshot illustrating a supplementary services configuration for a gateway in accordance with an embodiment.

FIG. 2AO is a screenshot further illustrating the supplementary services configuration of FIG. 2AN.

FIG. 2AP is a screenshot illustrating an advanced configuration for a gateway in accordance with an embodiment.

FIG. 2AQ is a screenshot illustrating an advanced media configuration for a gateway in accordance with an embodiment.

FIG. 2AR is a screenshot illustrating an advanced t.38 configuration for a gateway in accordance with an embodiment.

FIG. 3A is a screenshot illustrating a cellular service configuration for a router in accordance with an embodiment.

FIG. 3B is a screenshot illustrating a link backup configuration for a router in accordance with an embodiment.

FIG. 3C is a screenshot illustrating a LAN configuration for a router in accordance with an embodiment.

FIG. 3D is a screenshot illustrating an IP passthrough configuration for a router in accordance with an embodiment.

FIG. 3E is a screenshot illustrating a DHCP service configuration for a router in accordance with an embodiment.

FIG. 3F is a screenshot illustrating a device manager configuration for a router in accordance with an embodiment.

FIG. 3G is a screenshot illustrating a traffic manager configuration for a router in accordance with an embodiment.

FIG. 3H is a screenshot illustrating firewall settings configuration for a router in accordance with an embodiment.

FIG. 3I is a screenshot illustrating filtering settings configuration for a router in accordance with an embodiment.

FIG. 3J is a screenshot illustrating content filtering settings configuration for a router in accordance with an embodiment.

FIG. 3K is a screenshot illustrating IPSec settings configuration for a router in accordance with an embodiment.

FIG. 4E illustrates steps for sending binary commands between the router and modbus converter of FIG. 4D.

FIG. 4F illustrates steps for using the modbus library between the router and modbus converter of FIG. 4D.

DETAILED DESCRIPTION OF ILLUSTRATIVE EMBODIMENTS

In addition to telephone communications, many homes and businesses rely on POTS connections for fax lines, fire alarms, burglar alarms, elevator communication systems and alarms, parking gates, apartment complex security panels, blue lights, red light, out-of-band management and more. As POTS connections are phased out, communication service provider customers will require an alternative solution.

Figure 1:
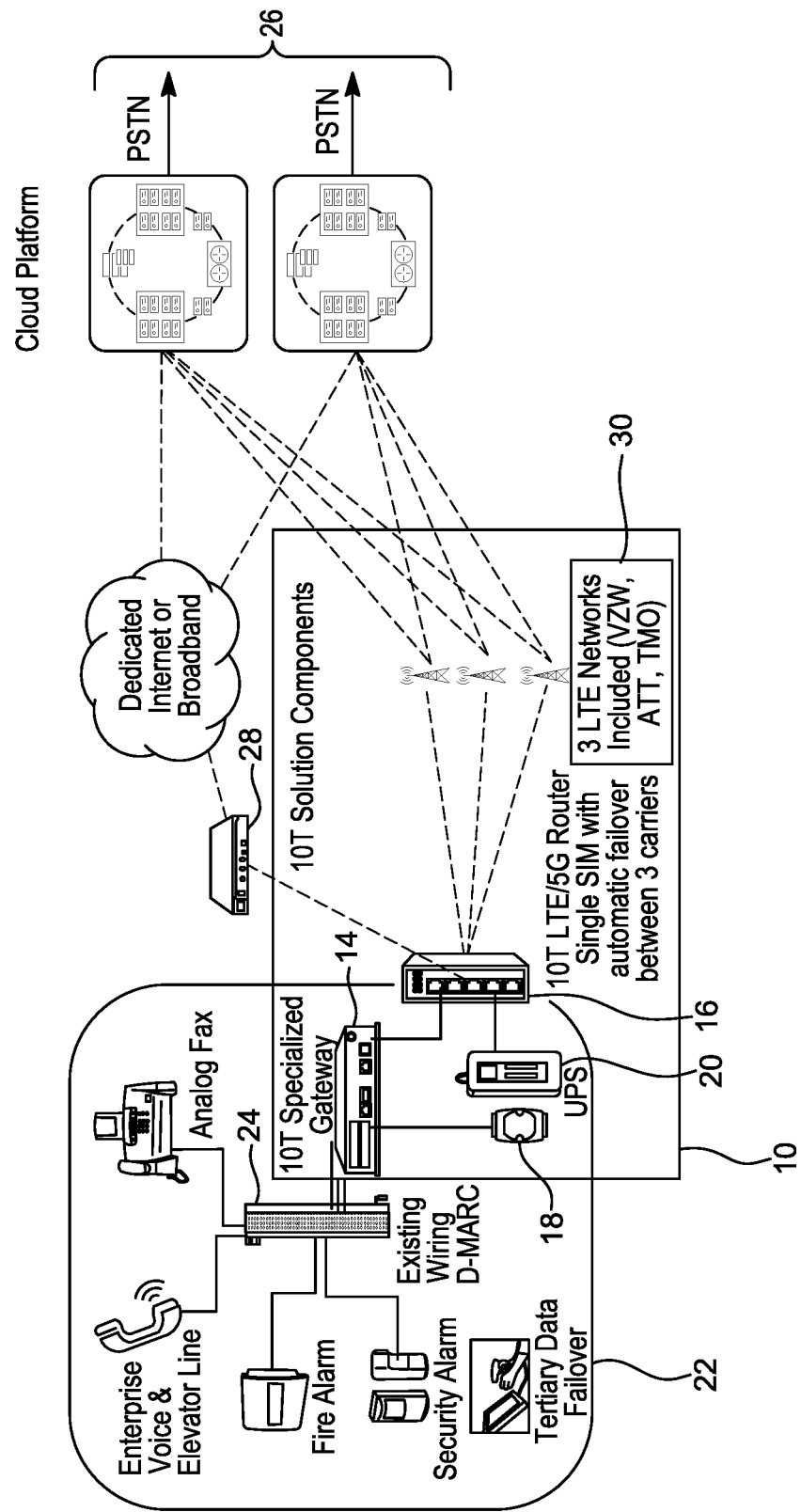
FIG. 1 is a block diagram of a POTS alternative solution in accordance with an embodiment.

FIG. 1 illustrates a schematic diagram of a POTS alternative 10 as part of a communications network 12 that may replace analog POTS lines while also providing customers with access to 5G networks and many value-added services that may be made available using 5G as a backbone. The POTS alternative may provide an end-to-end solution that scales, is simple to manage, provides cost savings, and is a fully managed deployment.

In an embodiment, the POTS alternative may comprise a gateway 14, a router 16, a modbus converter 18, and an Uninterruptible Power Supply (UPS) 20. The gateway 14 connects to customer premises equipment 22 through a wiring demarcation point 24, which marks the physical point where the public switched telephone network 26 normally ends and a customer's personal network begins. The POTS alternative now represents the demarcation point between the public switched telephone network and the customer's network. The customer premises equipment may include wiring for fire systems, voice systems, elevators, fax machines, blue light systems, point of sale systems, alarm systems, security gate systems, door access systems, panic buttons, meter readers, modem/out of band management systems, Supervisory Control and Data Acquisition (SCADA) applications, and Internet backup. The gateway 14 may provide all of the necessary translation needed for the signals to traverse a digital (Internet protocol) network instead the POTS (analog) network.

The router 16, which may be a Long-Term Evolution (LTE) 5G (LTE/5G) router connects to the gateway 14 and provides dynamic switching to a customer-provided Internet router 28 and to multiple cellular networks 30 based on a dynamic best network selection algorithm, as further described herein, that allows the router 16 to automatically always connect to the best cellular network 30. Finally, the modbus converter 18 and UPS 20 work in tandem with the gateway 14 and router 16 to provide a real-time view regarding battery characteristics, such as charge, status, power source, etc.

The gateway 14 may be an analog Voice Over Internet Protocol (VOIP) gateway manufactured by Sangoma Technologies, such as a 4 port Vega 60G v2 Analog Gateway model, an 8 port Vega 60G v2 Analog Gateway model, Vega 100G and 200G Digital Gateway models, Vega 400G Digital Gateway model, and Vega 3000G and 3050G Digital Gateway models, or models from other manufactures. The gateway 14 may enable conversion of traffic from Foreign eXchange Office (FXO) connections, Foreign eXchange Subscriber (FXS) connections, and VOIP connections. A FXO connection is a port that connects to a phone, analog fax machine or a modem. A FXS connection also connects to phones, fax machines and modems and delivers dial tone, ringing voltage, and battery power to FXO devices.

The router 16 may be a cellular router manufactured by Inhand Networks, including compact LTE industrial routers, such as IR302-4G LTE Router model and IR305-4G LTE Router model, cost-optimized routers for industrial and enterprise routers, such as IR615-4G LTE Router model, and high-end industrial and enterprise routers, such as ER805-4G LTE Router model and ER805-5G Router model, or models from other manufacturers. The router 16 may provide ethernet, WI-FI, serial ports, VPN security, dynamic routing and failover while providing reliable connectivity and business continuity solutions. The router 16 may include multi-carrier SIM cards and services. The SIM cards may be manufactured by iBasis, Inc. and provide access to multiple cellular networks on a automatic failover basis. In the U.S., such cellular networks and services may include those provided by AT&T, T-Mobile and Verizon Wireless.

When establishing a connection for the router 16, the router will initially use the SIM to connect to a cellular network with the best connection by testing each connection to see if it meets a threshold and if it does not, automatically testing the next service provider. The router and SIM work together to determine the best signal and cellular service provider at a given location. They sample radio characteristics such as Received Signal Strength Indicator (RSSI), Received Signal Code Power (RSCP), EC/IO (Energy per chip to Interference power ratio), RSRP (Reference Signal Received Power), SINR (Signal Interference+Noise Ratio), RSRQ (Reference Signal Received Quality) and other characteristics to determine acceptable thresholds. Once such thresholds are met, a connection is established and the router and SIM stay connected to the network. Once the thresholds are detected to have variance or if the performance is determined to be poorer, the router and SIM search again and attach to the next best available service provider. Between the three networks, absent the POTS alternative being located in a very remote location or some other event interfering with normal network connectivity, the connection to at least one of the three cellular networks will be above the threshold.

The UPS 20 may be the batteries and power supplies for the POTS alternative 10. The UPS 20 may be a UPS manufactured by Powertec Solutions, which may also provide continuous commercial and standby power to 12 VDC the customer premise equipment 22. The UPS 22 may be rated for use with all customer premise equipment devices requiring 12 VDC and 36 Watts (3 Amps) and may provide up to 24 hours of backup with up to 3 attachable battery packs. The current battery and power supply combination may depend on the battery standby capacity required as a customer location and the Powertec Solutions models may include Li150sp-12 combo kit, PS36L-P7 Power Supply, PS36L-EX-2 Battery, PS36L-EL-2 Battery, and PS7P55-25-2 Phoenix Connector.

The modbus converter 18, also known as a remote input/output (IO) controller, may be manufactured by ZLAN or Inhand Networks, and may include 4 digital relay outputs and 4 digital inputs, and 2 analog inputs, based on TCP or RS485 standards. The modbus converter 18 may be designed to connect to ethernet, RS485, and communication with Modbus TCP, Modbus RTU or we control. The modbus converter 18 may support remote IO control and data acquisition and support conversions from Modbus TCP to Modbus RTU, web control of 4 IO outputs, acquisition of 4 IO inputs and 2 analog inputs, as well as virtual serial port with the Modbus RTU protocol.

While software necessary to enable basic functionality of the gateway 14, the router 16 and the modbus 18 may be provided with some of the hardware devices, other device provide no software and require a POTS alternative software solution that enables each of the devices to work together as well as to enable custom configurations that enable the devices to perform unique features and functions.

The POTS alternative software solution configures the gateway 14, and tests parameters identified herein, in order to enable the gateway 14 to support the transmission of data to and from customer premises equipment 22 using outdated and/or obscure protocols, such as Contact ID, SIA, BFSK, 4+2, ModemII, ModemIIIa, V.21, V.27, RPS, Compass and others. These protocols form the backbone of the transmission medium required for the proper working of POTS alternative lines, such as fire/burglar panels, gates, legacy modems, etc.

Figure 2C:
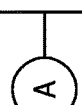
FIG. 2C is a screenshot illustrating a POTS line configuration of a gateway in accordance with an embodiment.
Figure 2J:
FIG. 2J is a screenshot illustrating further configuration for media capabilities of a gateway in accordance with FIG. 2I.
Figure 2K:
FIG. 2K is a screenshot illustrating a media capability configuration for voice-only features of a gateway in accordance with an embodiment
Figure 2N:
FIG. 2N is a screenshot illustrating a media capability configuration for a first voice codec of a gateway in accordance with an embodiment.
Figure 2O:
FIG. 2O is a screenshot illustrating a media capability configuration for a second voice codec of a gateway in accordance with an embodiment.
Figure 2P:
FIG. 2P is a screenshot illustrating a media capability configuration for a third voice codec of a gateway in accordance with an embodiment.
Figure 2Q:
FIG. 2Q is a screenshot illustrating a media capability configuration for a fourth voice codec of a gateway in accordance with an embodiment
Figure 2R:
FIG. 2R is a screenshot illustrating a media capability configuration for a fax codec of a gateway in accordance with an embodiment.
Figure 2T:
FIG. 2T is a screenshot illustrating a media capability configuration for a profile for data for a gateway in accordance with an embodiment.
Figure 2V:
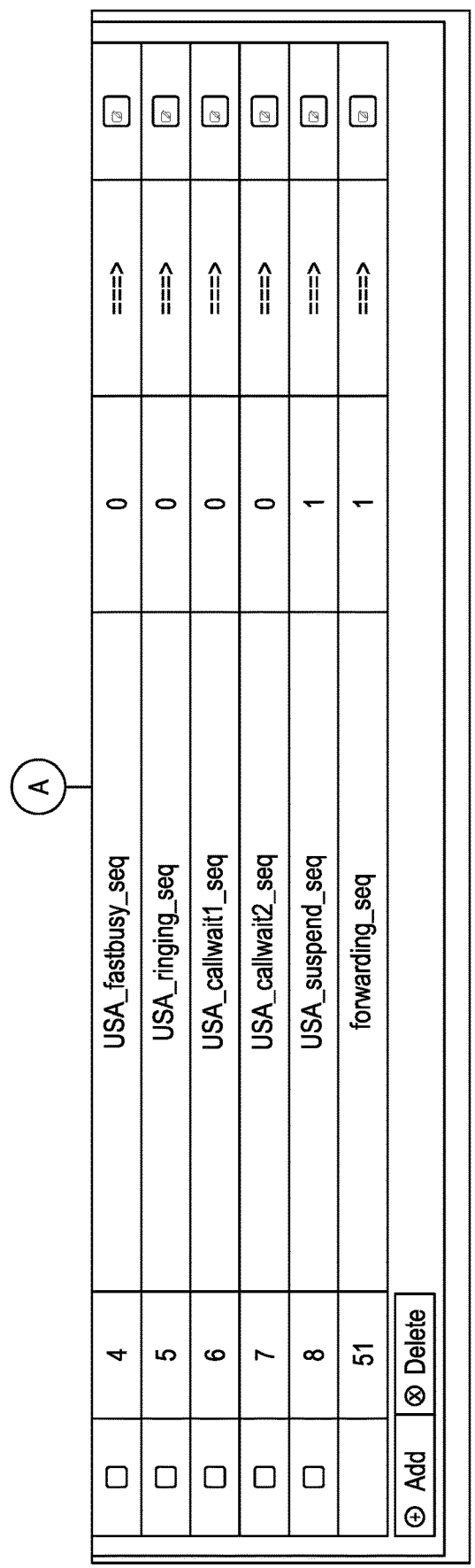
FIG. 2V is a screenshot illustrating a second part of a tone configuration for a profile for data for a gateway in accordance with an embodiment.
Figure 2A:
FIG. 2A is a screenshot illustrating a baseline configuration of a gateway in accordance with an embodiment.
Figure 2A:
Figure 2A:
Figure 2A:
Figure 2A:
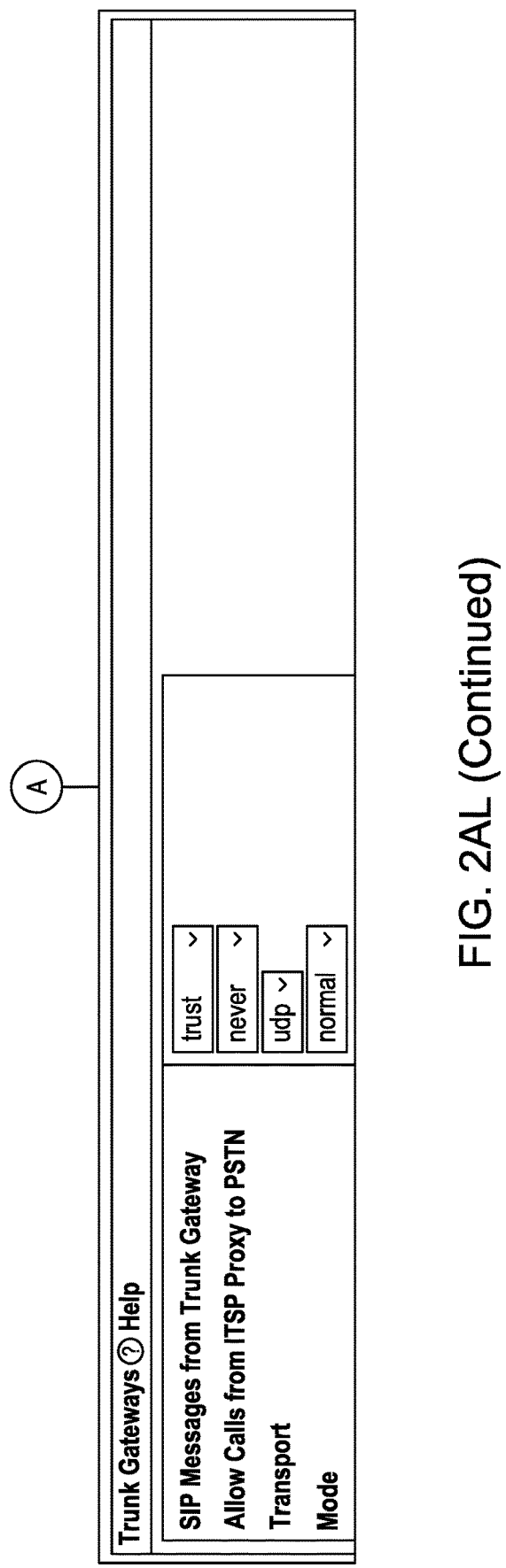
Figure 2A:
Figure 2A:

FIGS. 2A-2Z and 2AA-2AR provide details on all of the parameters that may be configured and tested in order to ensure the gateway 14 is able to support the required functionality of the POTS alternative. As the screenshots depicted in the figures are from a live gateway in production, certain items have been redacted to maintain privacy and confidentiality but not of the redacted items are relevant to the overall functionality of the gateway 14. For example, as shown in FIG. 2A, for each different model or router uses in a POTS alternative, the baseline configuration of the gateway 14 first needs to be established by identifying the gateway system and its associated firmware file, the registrar and proxy information, the status of the media, such as DSP status, the interfaces being accessed, the LAN information, the SIP registrations, the time and date and calling information going through the gateway 14.

As shown in FIG. 2B, the gateway may then be configured to ensure that the gateway has a stable connection to the Internet, which may be achieved by configuring each LAN port to allow full duplex, to allow 10 BASE-T, to allow 100 BASE-TX, to establish the proper 802.1pQ QoS (quality of service) profile, such as a default setting or a custom setting, to accept non802.1pQ tagged frames, and to set a Tx Rate limit as appropriate.

As shown in FIG. 2C, the gateway may then be configured to ensure that each line of the gateway is configured properly and will support the FXS and FXO lines that will connect to it. For each FXS port enabled, the mode may be set to "normal", caller ID is set to "on", call transfer is set to "on", call waiting is set "off", call conference is set "off", DND enable is set to "on", DND response is set to "instantly reject", DND off-hook deactivate is set to "off", call forward enable is set to "on", the RDM profile is set to "1" and the hardware profile is set to "1". For each FXS port, the FXS port hardware profile may be configured so that line reversal is "disabled", the hookflash debounce time is set to "75" milliseconds, the hookflash time is set to "500" milliseconds, the impedance is set at "600R" for that countries PSTN infrastructure, the DTMF dial-out delay is set to "500" milliseconds, the visual message-waiting indication is set to "tone", the loop current break is "enabled", the loop current time is set to "300" milliseconds, the loop current delay is set to "50" milliseconds, the ring voltage is set to "80 Vrms" (root-mean-square voltage), the line length is set to "normal" or whatever is appropriate, the dialed DRMF detection is "enabled", and the call forward no-answer timeout is set to "15" seconds. With pulse dial detection set to "enabled", the parameters may be pulse dial encoding set to "normal", pulse minute break time set to "40" milliseconds, pulse maximum break time set to "70" milliseconds, pulse minimum make time set to "30" milliseconds, pulse maximum make time set to "50" milliseconds, and pulse minimum interdigit time set to "300" milliseconds.

For the two enabled ports, the first port may be further configured as illustrated in FIG. 2D. The ring profile may be set to the appropriate country, such as external to the US. For the selected port interface profile, the caller ID type may be set, along with the caller ID wait time to "6000" millisecond and the caller ID time to "DST". Other profile settings include the number of DTMF dial digits, the DTMF dial timeout and the line busy cause. For the selected ring profile, the frequency may be set to "20" repeats, with repeat enabled, with ring1 on for 2000 milliseconds and ring1 off for 2000 milliseconds. As the ring is set to repeat there is no need to set further ring on/offs. The ports may be duplicated, as is shown in FIG. 2E for the second port, or they may be configured differently. The number of ports depends on the type of gateway and its size.

FIG. 2F illustrated the configuration of a dial play. The dial plan includes settings that specify the specify the behavior of a phone as a user enters a number in off-hook dialing mode. Different profiles, such as "To_SIP" and "To_FXS" may be enabled. For those enabled profiles the planner groups may be configured for certain cause codes and a range of active times. For each call presentation group, if enabled, can specify the interface, sequence mode, destination timeout, destination timeout action, the mas destination attempts and the appropriate cause code. For overlap dialing, it may be enabled or not. SIP overlap dialing for TX may also be separately enabled.

As shown in FIG. 2G, if the SIP profile is "enabled", the dial plan may be configured to govern the behavior of the phone for calls made from an analog device to a digital device, such as by specifying the source and destination. As shown in FIG. 2H, if the FXS profile is enabled, the dial plan may be configured to govern the behavior of the phone for calls made from a digital device to an analog device, again by specifying the source and destination.

As shown in FIG. 2I, media capabilities may also be configured to govern the codecs that will be used during the transmission of voice, fax, modem or other data over the Internet. For example, for different types of voice lines, different capability indices (codecs) may be established and the voice lines may be set of "voice only". A modem may be set up differently such that it has a different indices setting and is set up for data only. Each of the corresponding codecs may be set up with different packet profiles and packet times. For example, packet profile 1 corresponding to the g7231 codec may be set up for voice so that silence suppression is disabled, echo canceller is disabled, out of band DTMF is off, the adaptive playout mode is silence, the nominal playout delay is "1" millisecond, the maximum playout delay is "5" milliseconds, the initial playout delay is "2" milliseconds, and the RX gain and TX gain are each set to zero.

FIG. 2J sets forth further setting for packet profile 1 for data and FAX, and similar settings for packet profile 2. With respect to the voice setting, packet profile 2 is set the same except that echo canceller is "enabled", out of band DTMF is "on", the nominal playout delay is "0", and the maximum playout delay is "4". With respect to data, both profiles are set the same with echo canceller "disabled", out of band DTMF turned "off", adaptive playout mode "disabled", nominal playout delay set to "2" and maximum playout delay set to "4". With respect to FAX, all of the settings are set the same except that for packet profile 1 the FAX TCF mode is "transferred", and for packet profile 2 the FAX TCF mode is "local". Otherwise, for both, the FAX maximum rate is "144", the FAX maximum playout delay is "4", the FAX TX level is "-8 db", the G.726 bit rate is "32", the G.723.1 bit rate is "6.3", the OCTET RTP payload type is "98" and RTCP is "disabled". TDM profiles and medial control profiles may also be set.

FIG. 2K illustrates a media capability configuration setting that encapsulates voice only features for specified capabilities indices, such as 1,2,3. FIG. 2L illustrates a media capability configuration setting that encapsulates voice and fax features for specified capabilities indices, such as "4,3,2,1,5,6,7". FIG. 2M illustrates a media capability configuration setting that encapsulates data only features for specified capabilities indices, such as "3".

FIG. 2N illustrates a media capability configuration setting that determines the profile for a specified voice codec, such as profile 2 with a packet time of "30" milliseconds for codec g7231. FIG. 2O illustrates a media capability configuration setting that determines the profile for a specified voice codec, such as profile 1 with a packet time of "30" milliseconds for codec g711alaw64k. FIG. 2P illustrates a media capability configuration setting that determines the profile for a specified voice codec, such as profile 1 with a packet time of "20" milliseconds for codec g711Ulaw64k. FIG. 2Q illustrates a media capability configuration setting that determines the profile for a specified voice codec, such as profile 2 with a packet time of "40" milliseconds for codec g729. FIG. 2R illustrates a media capability configuration setting that determines the profile for a specified fax codec, such as profile 1 with a packet time of "30" milliseconds for codec t38udp. FIG. 2S illustrates a media capability configuration setting that determines the profile for a specified fax codec, such as profile 1 with a packet time of "30" milliseconds for codec cn. FIG. 2T illustrates a media capability configuration setting that determines the profile for a specified fax codec, such as profile 2 with a packet time of "20" milliseconds for codec octet.

FIG. 2U and FIG. 2V illustrate configuration settings that provide an ability to fine tune the detection and relay of tones, such as dialtone, message waiting, busytone, fastbusy, ringback, callwaiting, suspended and forwarding, and the sequencing of those tones, such as a first frequency and amplitude and a second frequency and amplitude, the on time, the off time and how many time they may be repeated.

FIGS. 2X, 2Y and 2Z illustrate configuration settings for all parts of the signaling interface or SIP. In FIG. 2X, local SIP Port and local SIP TLS ports are identified. The ability to accept non-proxy invites may be turned on or off. For each SIP profile, the interface ID may be set along with other SIP profile parameters. The SIP registration may be shown, registration may be enabled or disabled, and the mode of the registration may be specified. Additional SIP settings, such as SIP registration users configuration, SIP authentication configuration, namespace configuration, and SIP music on hold configurations may be set. In FIG. 2Y, a local phone context may be enabled and disabled. When enabled, the name of the local phone may be specified along with settings for TON and NPI. A remote phone context may be enabled or disabled. When enabled, the name of the remote phone may be specified along with settings for TON and NPI. SIP session timers may also be configured, including a default URI scheme, enabling the allowing of SIP URI Schemes, using T38 annexE, and accepting T38 annexE. Setting for fax detection and modem detections, such as terminating, may also be set. FIG. 2Z illustrates further configuration setting for the SIP session timers, such as the medial control profile, signaling application ID, T1 retry timer increments and T2 retry timer limits, maximum calls and SIP signal transport. Further advance settings include SIP respons-Q.931 cause mapping, Q.931 cause-SIP response mapping and advanced SIP.

FIG. 2AA illustrates configuration settings for a SIP profile that may allow the user to fine tune particular parameters that are needed to interoperate with different types of session border controllers. After identifying an existing profile or creating a new one, the interface ID can be identified, along with the local domain and any alternative local domain. The from header userinfo may be set to identify the "calling party". The contact header userinfo and P header userinfo may be set to "authentication username" and the from header host, to header host and redirection host may be set to "local domain". The transport setting may be set to "tcp". A capability set may be set to "3-g711faxmodem" Reliable provisional responses may be turned off, DTMF transport may be set to "rfc2833", and DTMF info may be set to "mode 1". The RFC2833 payload may be set to "101", call admission control may be disabled. Max inbound calls and max outbound calls may be set to "120" each, and CAC cause code may be set to "503".

FIG. 2AB continues illustration of the configuration settings for the SIP profile of FIG. 2AA, related to proxy parameters, proxies and registration parameters. For the proxy parameters, the request-URI port may be listed as "5060", the minimum valid SIP response to "180", and the proxy mode set to "dnssrv". The timeout may be set to "5000" milliseconds, the proxy retry delay set to "0" seconds. Accessibility check may be turned off, the check interval set to "20" seconds and the transport set to "tcp". For the proxies, for a particular SIP proxy having an identified IP/DNS name, the proxy may be enabled, the port set to "5060" and the TLS port set to "5061". For the registration parameters, the registration request URI port may again be se to "5060", the registration expiry time set to 600 seconds. The max number of registrars may be set to "3", the minimum valid SIP response may be set to "200", the registration mode may be set to "dnssrv", timeout set to "5000" milliseconds and registrar retry delay set to "0" seconds. FIG. 2AC continues illustration of the configuration settings for the SIP profile of FIG. 2AB related to registration parameters. The accessibility check may be turned off, the check interval set to "30" seconds and the check transport set to "tcp".

FIG. 2AD illustrates configuration settings for a SIP profile that may allow the gateway to register with a particular session border controller or other destination gateway. For each user identified, the registration is enabled, the profiles are identified, and the DN, username and authentication user index are identified. The latter information is redacted because the example is from an actual user setting so their confidential information is blocked. FIG. 2AE illustrates authentication settings required for the gateway for each identified user, including the username (redacted), a password (redacted) the subscriber information and the resource priority. FIG. 2AF illustrates configuration settings for SIP namespaces. For each namespace, the name and priorities, such as "routine, priority, immediate, flash, flash-override", may be specified, as well as the type may be fixed. Lastly, FIG. 2AG illustrates configurations settings for music on hold, such as to "silent", the URI may be set to "null" for a specified IP/hostname and port.

FIG. 2AH illustrates advanced configuration settings for SIP that tend to be different for each session border controller or other destination gateway. The parameter settings include BYE also invited to proxy, refer invited to proxy, and 3xx invite to proxy, each of which may be set to off. The user agent header may be set to "1", the user agent header ext to "null" and maximum SEP forking to "3". The redirected invite's preserve to header may be set to "on" and the refer to header target may be set to "contact". The use request URI in call dialog matching may be set to "on" and the 183 session progress if media present may be set so that if it is ="2" then send 183 instead of 190 with sdp. In this example, it is set to "2". The disconnect if progress with cause received may be set to off, with disconnect with progress and early OK timers set to off. The restricted user display name may be set to anonymous, the user maddr in contact header may be set to off. The outgoing call setup timeout may be set to 15000, the to header URI parameters and from header URI parameters may both be set to "null". The privacy standard may be set to "RFC 3323" and the P-asserted standard also set to "RFC 3323".

FIG. 2AI continues illustration of the configuration settings for the SIP profile of FIG. 2AH. The national prefix and international prefix may be set to "off" and the source of TEL may be set to "request-URI". The OLI CPC settings may be set for that value of cpc is set to "null", use Cisco format cpc set to "off" and ANI information digits to "0". The media control of T38 to use audio port may be set to "off". The SDP controls may be set as follows: codec selection preference to "remote", clear channel codec mode to "rfc4040", singled media description in T38 invite to "on", connection information in session description only to "on", packet time mode selection to "off", each of enable max packet time parameter, SDP offer 0.0.0.0. when initiating hold, SDP answer 0.0.0.0. when put on hold, use FQDN, enable silence suppression parameter, and enable echo cancellation parameter each set to "off", with allow annexb parameter set to "on".

FIG. 2AJ continues illustration of the configuration settings for the SIP profile of FIG. 2AI. The SIP user to user messages setting for enable protocol discriminator may be set to "on". The SIP INFO messages settings for transmit DTMF INFO messages and transmit hookflash INFO messages may both be set to "on". The SIP OPTION messages settings for call blocked response, PRI unavailable response and first option response may each be set to "200". The SIP option response may be set to at least "200,404,483,407, 401,405,501". The TCP options setting for TCP socket cleanup mode may be set to "0" and the use existing TCP connection may be disabled. The SIP update message setting for send update message on facility may be enabled. The SIP register request for use hostname in contact header may be enabled and the add transport parameter in contact header or register request may be disabled.

FIG. 2AK illustrates configuration settings for the SIP proxy that may be network dependent and also important for proper interoperability with a particular session border controller or other destination gateway. The SIP proxy configuration for mode may be "off", for realm may be set to 'abcdefghijwhatever.com" and Rx port to "6060". The SIP proxy registered users may be listed if there are any. The SIP proxy auth users may be identified by aliases, and for each user ID, the user name, aliases and password may be listed. The SIP proxy IP filters for ignored IP address may be identified by an ID and the IPmix and IP max identified. The SIP proxy IP filters for rejected IP address may be identified by an ID and the IPmix and IP max identified. FIG. 2AL continues illustration of the configuration settings for the SIP profiled of FIG. 2AK. The SIP proxy IP filters for trusted IP address may be identified by an ID and the IPmix and IP max identified. The SIP ITSP proxies may have the mode set as "normal", proxy test set as "options", test interval set at "30" seconds, and transport set to "udp". For each ID, the IPhost IP address may be identified with the port set to "5060" and the TLS port set to "5061". FIG. 2AM continues illustration of the configuration settings for the SIP profiled of FIG. 2AL. The trunk gateways settings may be set as follows: SIP messages from trunk gateway set to "trust", allow calls from ITSP proxy to PSTN to "never", transport to "udp", mode to "normal", test to "options" and test interval set to "30" seconds. For each gateway ID identified, it may be enabled and an indication may be provided as to whether it is a PSTN gateway. If so a truck gateway at a specified IP address may be identified. If not, then the IP address, port and tlx port are identified as "5060" and "5061", respectively. For the trunk gateway call routing, for each identified id, a description, such as "emergency" may be provided, with the call attributes, such as "tel-911" along with the trunk gateway ID list, the routing rule and any redirection responses. For the PSTN gateway fallback, the trunk gateway ID list may be identified along with the routing rule and the redirection response.

FIG. 2AN and FIG. 2AO may illustrate configuration settings for additional supplementary services that may be required. The supplementary services parameters may be "enabled" and a profile for each supplementary service may be provided. The profile settings may include: call waiting mode set to "with command mode", call conference mode set to "with command mode", call waiting hangup action set to "hangup all", transfer on hangup set to "on", recall set to "1", blind transfer code set to "*98", consultative transfer code set to "*99", DND enable code set to "*78", DND disable code set to "*79", call cycle code set to "1", call clear code set to "*52", call conference code set to "*54", call forward unconditional enable code set to "*72", call forward unconditional disable code set to "*73", call forward busy enable code set to "*90", call forward busy disable code set to "*91", call forward no answer enable code set to "*92", call forward no answer disable code set to "*93", and disable all code set to "*00". The SIP do not disturb status code may be set to "480" and the status text to "Do Not Disturb". In FIG. 2AO, the SIP call waiting status code may be set to "off" with the status text set to "null". For each supplementary services user port ID identified, the type may be specified, such as "FXS", it may be enabled, call waiting may be set to "on" or "off", and DND enable may be set to "on" or "off". A DND response of "instant_reject" may be specified, DND off-hook deactivate may be set to "on" or "off", and call forward enable may be set to "on" or "off". Lastly, for each port ID settings for do not disturb, call forward destination, call forward unconditional, call forward busy, and call forward no answer may be provided.

FIG. 2AP illustrates configuration settings that may be required for a gateway to work in certain scenarios. A blocking cause code of "34" may be provided. LAN parameters such as RTP checksum may be turned "on". A temperature alert may be set. Other cause codes may be provided. The active boot partition may be specified. Banners and console parameters may be set. An advance media configuration and an advanced T38 configuration may be provided. FIG. 2AQ sets forth configuration settings that may be provided for an advanced configuration setting. Those include: dynamic codec switch set to "off", RTP port range list set to "1-rtp_ports", V25 control set to "ignore", V21 wait time set to "4500" milliseconds, media fail detect time set to "0" milliseconds, direct TDM enable set to "off", direct RTP enable set to "off", DTMF level set to "−9", DTMF twist set to "−2", DTMF cadence on time, DTMF cadence off time, silence cadence on time, and silence cadence off time, each set to "90" milliseconds. FIG. 2AR sets forth configuration settings that may be provided for advanced T38, including: T38 UDP port range list set to "3-t38_udp_ports", T38 TCP port range list set to "2-t38_tcp_ports", T38 max buffer and T38 max datagram both set to "200", T38 UDPTL redundancy depth control set to "2", T38 UDTPL redundancy depth image set to "0", and T38 allow ECM set to "off".

Figure 3L:
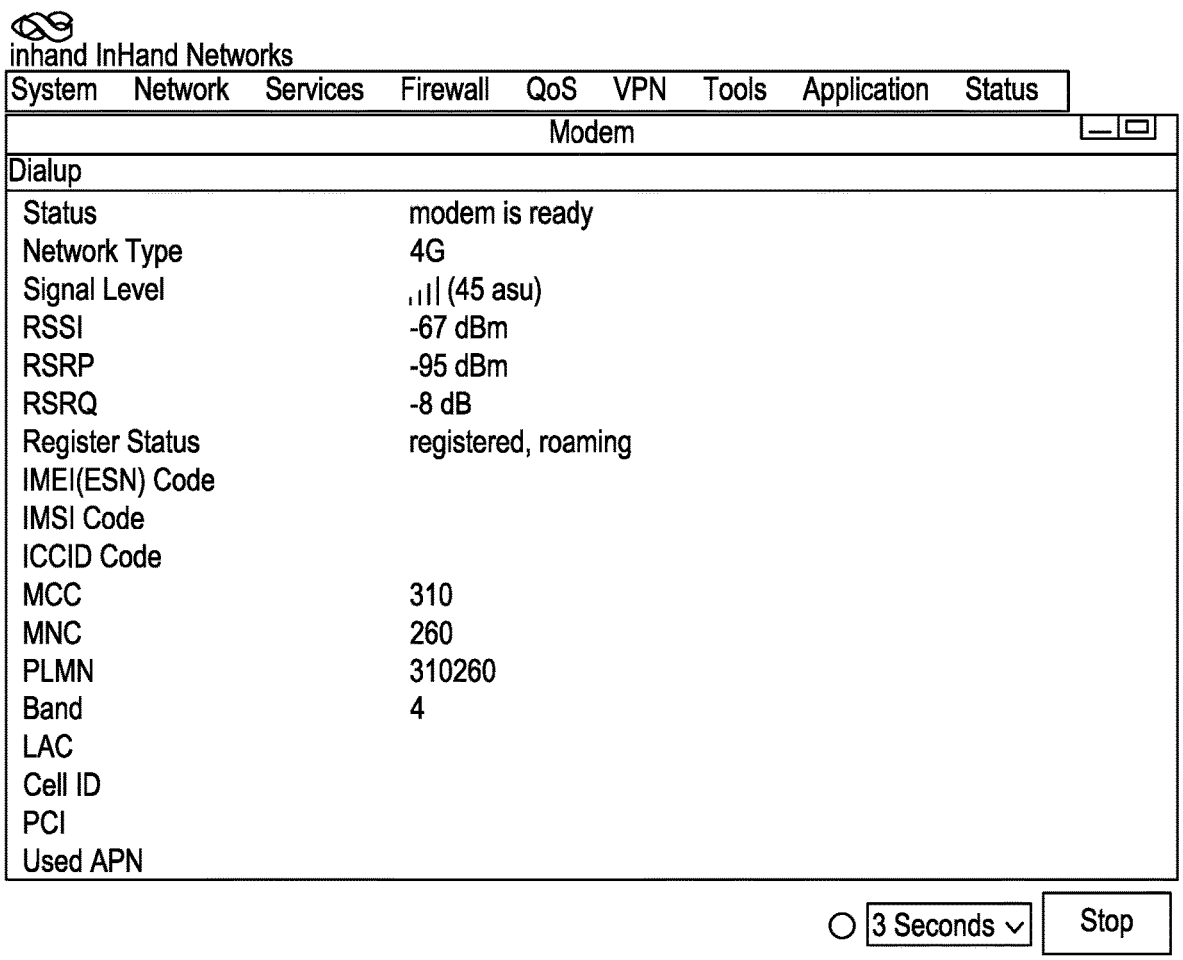
FIG. 3L is a screenshot illustrating a router connected to a service provider in accordance with an embodiment.

FIGS. 3A-3L illustrate configurate settings for a router 16 manufactured by Inhand Networks that enable the POTS alternative to automatically and perpetually connect to the best cellular network from among the multiple cellular networks that may be available. As FIGS. 3A-3L are based on screenshots from an actual live router, certain items have been redacted, but have no effect on the overall functionality of the router. FIG. 3A illustrates configuration settings for connectivity with a cellular network. These settings may be established to ensure all settings are used correctly. The router may be enabled and a specific time schedule for the router may be established. If the router has a shared connection, this may be identified. If the router has a default route, this may also be identified. The network provider (ISP) may be identified, or in this case, a custom setting for the ISP may be established. The access point name (APN) for the specified ISP (redacted) may be provided, along with an access number, username and password. The network select type may be set to "auto". The connection mode may be specifieid to be "always online" with a redial interval of "30" seconds. Advanced settings may also be specified. These may include the following: initial commands may be set to "AT", binding ICCID may be provided, PIN code may be provided, static MTU may be identified and if so, MTU may be set toe "1500" with the SIM card operator and authentication type both set to "auto". The user of peer DNS may be identified. A link detection interval of "55" seconds may be specified. Debug and debug model may be specified. ICMP detection mode may be set to "ignore traffic". ICMP detection server may be specified by an IP address. ICMP detection interval may be set to "300" seconds. ICMP detection timeout may be set to "20" seconds. ICMP detection retries may be set to "5".

FIG. 3B illustrates settings for configuration of a link backup. These settings enable a user to select the backup interval between various supported interfaces on the router 16. Link backup may be enabled and the main link, such as "WAN" may be specified. The ICMP detection server (redacted) may be provided. For that server, the ICMP detection interval may be set to "5" seconds, ICMP detection timeout may be set to "3" seconds, and ICMP detection retries may be set to "3". The backup link may be set to "dialup" and the backup mode may be set to "hot backup".

FIG. 3C illustrates settings for configuration of a LAN. The LAN settings may be required for all POTS alternative users that will be connected to the LAN side of the router 16.

The type of LAN connection, such as "static IP" may be specified, along with the MAC address for the router, its IP address (redacted) and a netmask of "255.255.255.0". The MTU may be set to "default", the LAN mode may be set to "auto navigation", and each of the ports may be enabled.

FIG. 3D illustrates settings for configuration of IP passthrough. The IP passthrough settings govern whether the cellular IP address is passed to a particular device on the LAN side of the router. This setting may be enabled or disabled.

FIG. 3E illustrates settings for configuration of DHCP service. The DHCP service settings determine the IP range for dynamic IP addresses on the LAN side of the router. DHCP may be enabled and if enabled the IP pool starting and ending addresses (redacted) may be provided. The lease may be set at "60" minutes, the DNS IP addresses may be provided, the Windows name server (WINS) IP address may be provided. If the domain option is enabled, that domain name, such as "inhand-router.com" may be provided. For any static DHCP provided, the MAC address, IP address, and host may be provided.

FIG. 3F illustrates settings for configuration of a device manager. The device manager settings provide the ability for the router 16 to connect to a remote management cloud service. If enabled, the service type, such as "device manager" may be specified, and the server name provided, such as "iot.inhandnetworks.com". If it is a secure channel, that may be identified. The registered account (redacted) may be provided along with the site name. LBS info upload interval may be set to "1" hour, series info upload internal may be set to "1" hour, and channel keepalive may be set to "30" seconds.

FIG. 3G illustrates settings for configuration of a traffic manager. The traffic manager settings provide greater control over the traffic flowing through the router 16. If enabled, the start day may be set to "1", a monthly threshold in megabytes may be specified, and a rule for when the monthly threshold is exceeded may be specified, such as "block except management". Likewise, an alarm threshold in megabytes may be specified, a last 24-hours threshold in kilobytes may be specified, and a rule for when the over 24-hours threshold is exceeded may be specified, such as "block except management".

FIG. 3H illustrates settings for configuration of a firewall. The firewall settings provide greater control over the features of the router 16. The settings include the ability to "accept" a default filter policy, to block anonymous WAN requests, such as pings<, to enable filter multicast, and to defend denial-of-service (DOS) attacks.

FIG. 3I illustrates settings for configuration of filtering. The filtering settings provide greater control over the filtering features of the router 16. If enabled, the proto can be identified, along with a source IP address, a source port, a destination, a destination port, an action, such as "accept", an indication of whether to log, and a description.

FIG. 3J illustrates settings for configuration of content filtering. The content filtering settings provide greater control over the content filtering features of the router 16. If enabled, the settings include the IP address of a URL, and action, such as "accept", an indication of whether to log, and a description.

FIG. 3K illustrates settings for configuration of IPSec. The IPSec settings provide greater control over setting up IPSec and other security features of the router 16. If NAT-Traversal (NATT) is enabled, the keep alive time interval of NATT may be specified, such as "60" seconds. Compression may be enabled, along with debug, force NATT and dynamic NATT port.

FIG. 3L illustrates that once the router 16 is properly configured, it will successfully connect to a cellular network. In the example connection illustrated, the status indicates that the "modem is ready", that the network type is "4G", that the signal level is five bars "45 asu", the RSSI is "−67 dBm", RSRP is "−95 dBm", RSRQ is "08 dB", and the registration status is "registered, roaming". The IMEI (ESN) code (redacted), the IMSI code (redacted) and the ICCID code (redacted) may also be provided. The MCC is indicated to be "310", MNC at "260", PLMN at "310260" and the band at "4". The LAC (redacted), cell ID (redacted), PCI (redacted), and used APN (redacted) would also be indicated.

Figure 4A:
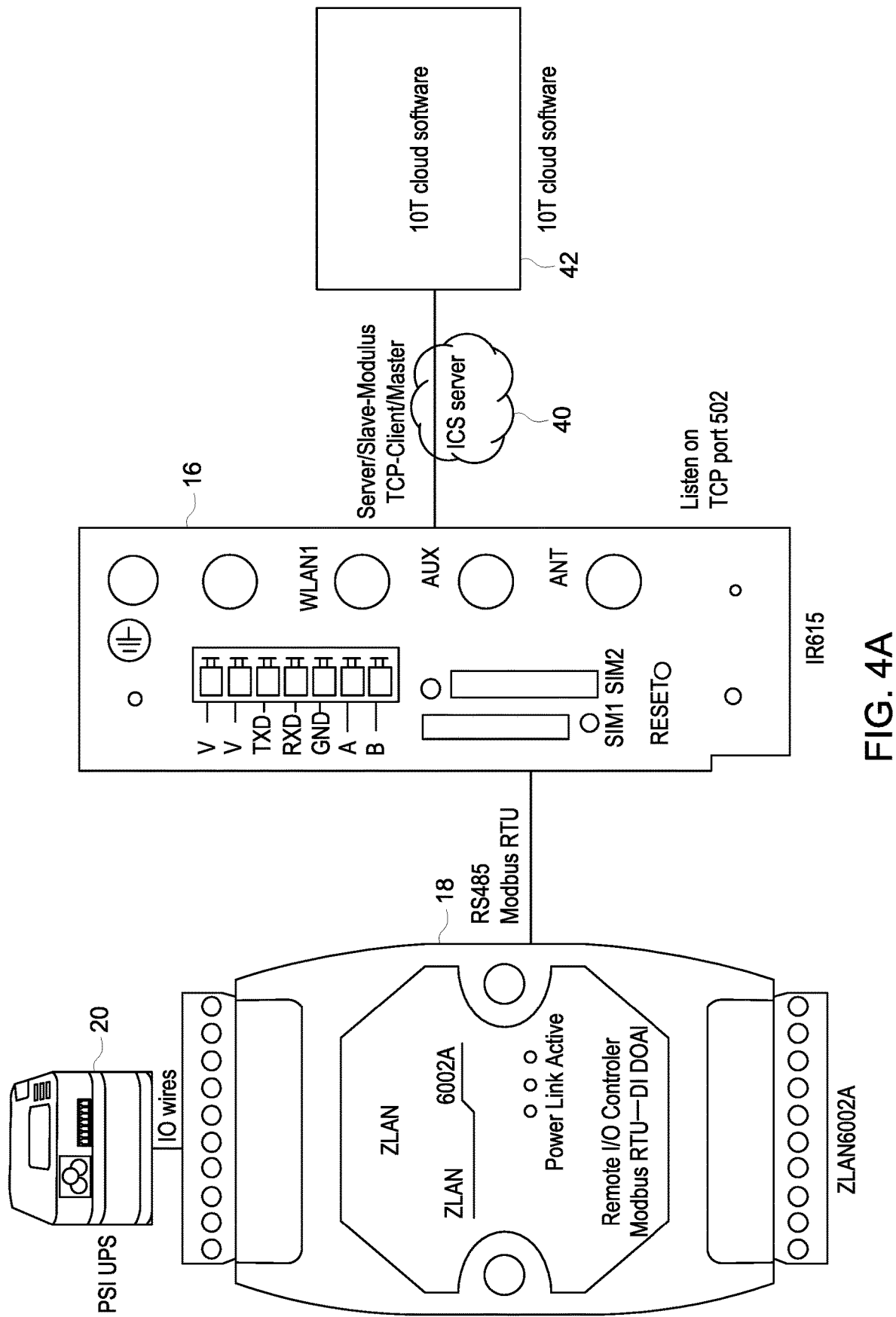
FIG. 4A is an illustration of an overall design configuration of the POTS Alternative of FIG. 1 in accordance with an embodiment.
Figure 4B:
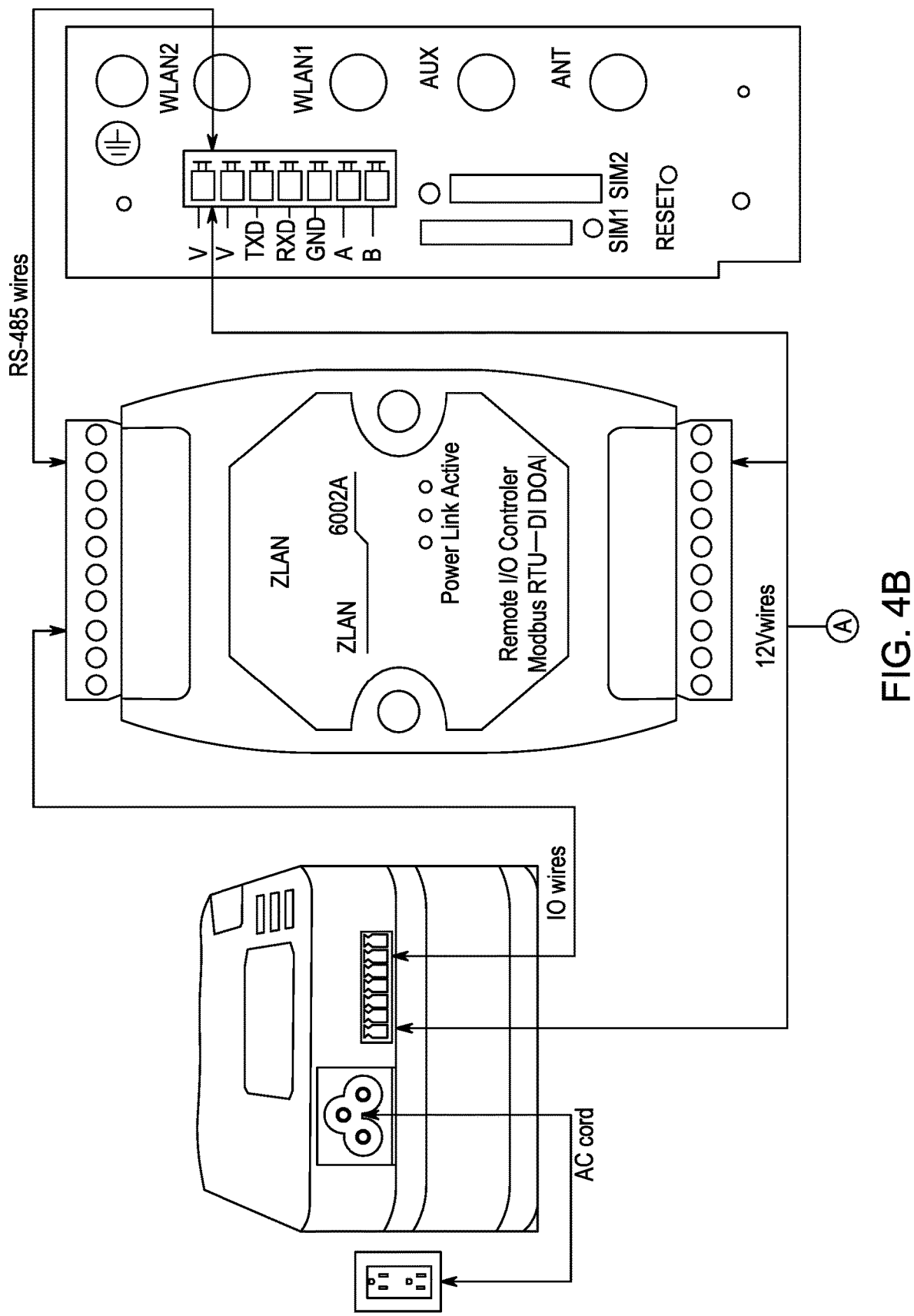
FIG. 4B is an illustration of the wiring diagram for FIG. 4A.
Figure 4C:
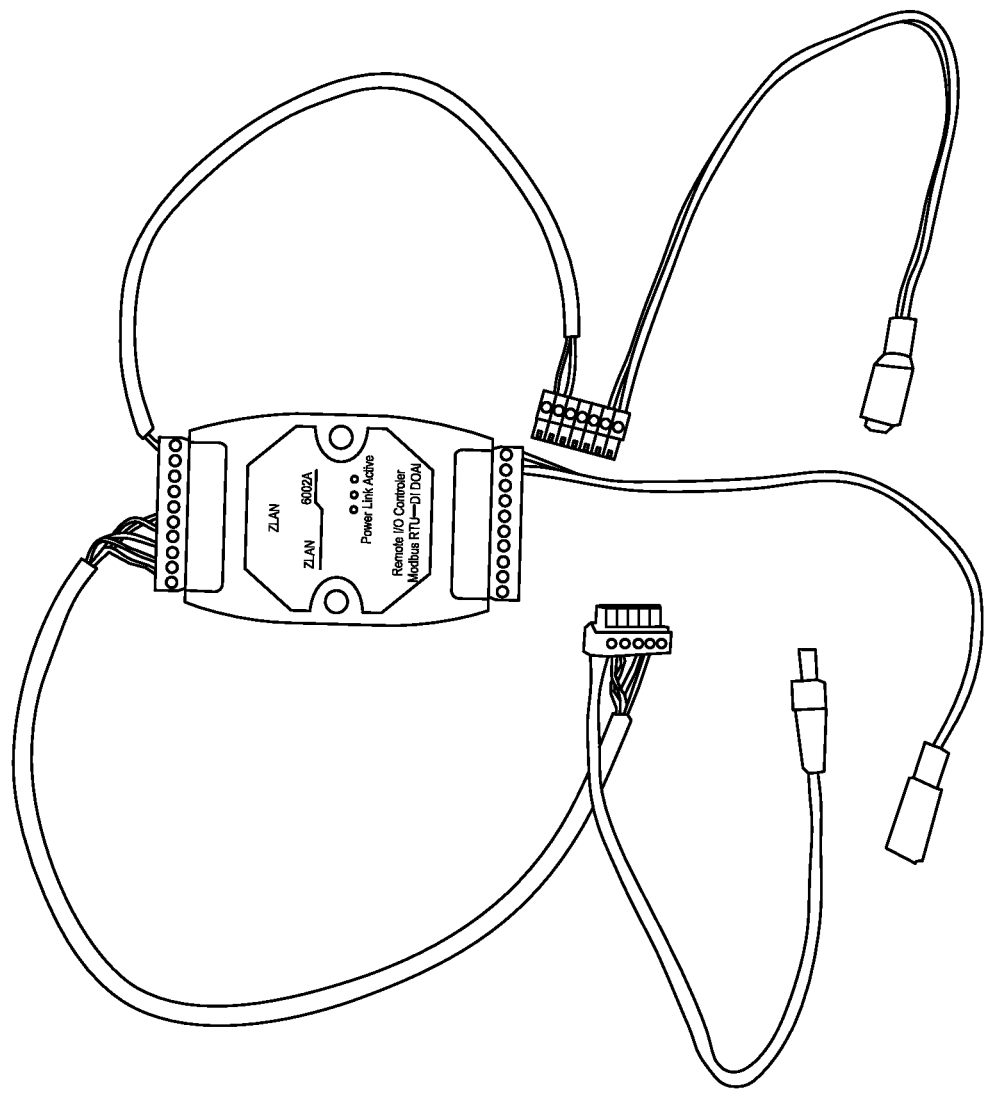
FIG. 4C is an illustration of the wiring arrangement and connectors for the modbus converter of FIG. 4A and FIG. 4B.

FIGS. 4A-4G illustrates the integration of the modbus converter 18 with the UPS 20 and the router 16 in order to create a solution that continuously monitors the status of the UPS 20. As illustrated in FIG. 4A, the UPS 20 is connected to the modbus converter 10, which is connected to the router 16, which connects via the Internet connection sharing (ICS) server 40 to POTS cloud software 42. This allows the POTS cloud software 42 to monitor the UPS 20 for various conditions, including power source (AC power or battery power), state of charge of the battery, battery faults, and other conditions. All data collected from the UPS 20 through the modbus converter 18 and the router 16 is transmitted via Internet router 28 (shown in FIG. 1) to an Internet connection sharing server 40 to POTS software 42 on a cloud storage solution. FIG. 4B illustrates the wiring diagram for the UPS 20 (identified as "PSI"), modbus converter 18 (identified as "ZLAN 6002A" and router 16 (identified as "IR615") of FIG. 4A. FIG. 4C the wiring arrangement and connectors for the modbus converter 18 that enables it to form a connection between the UPS 20 and router 16.

Figure 4D:
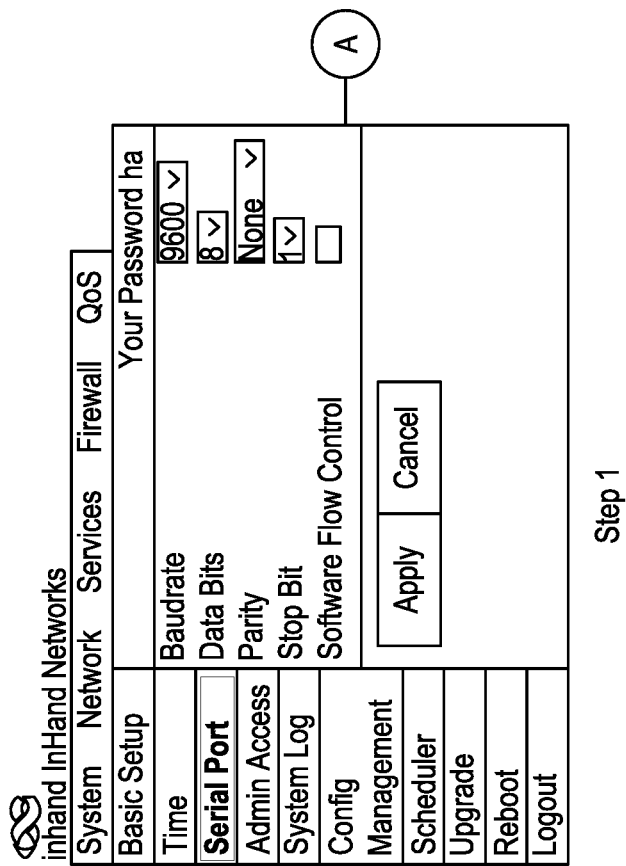
FIG. 4D illustrates steps for configuring a router connection to a modbus converter in accordance with an embodiment.
Figure 4D:
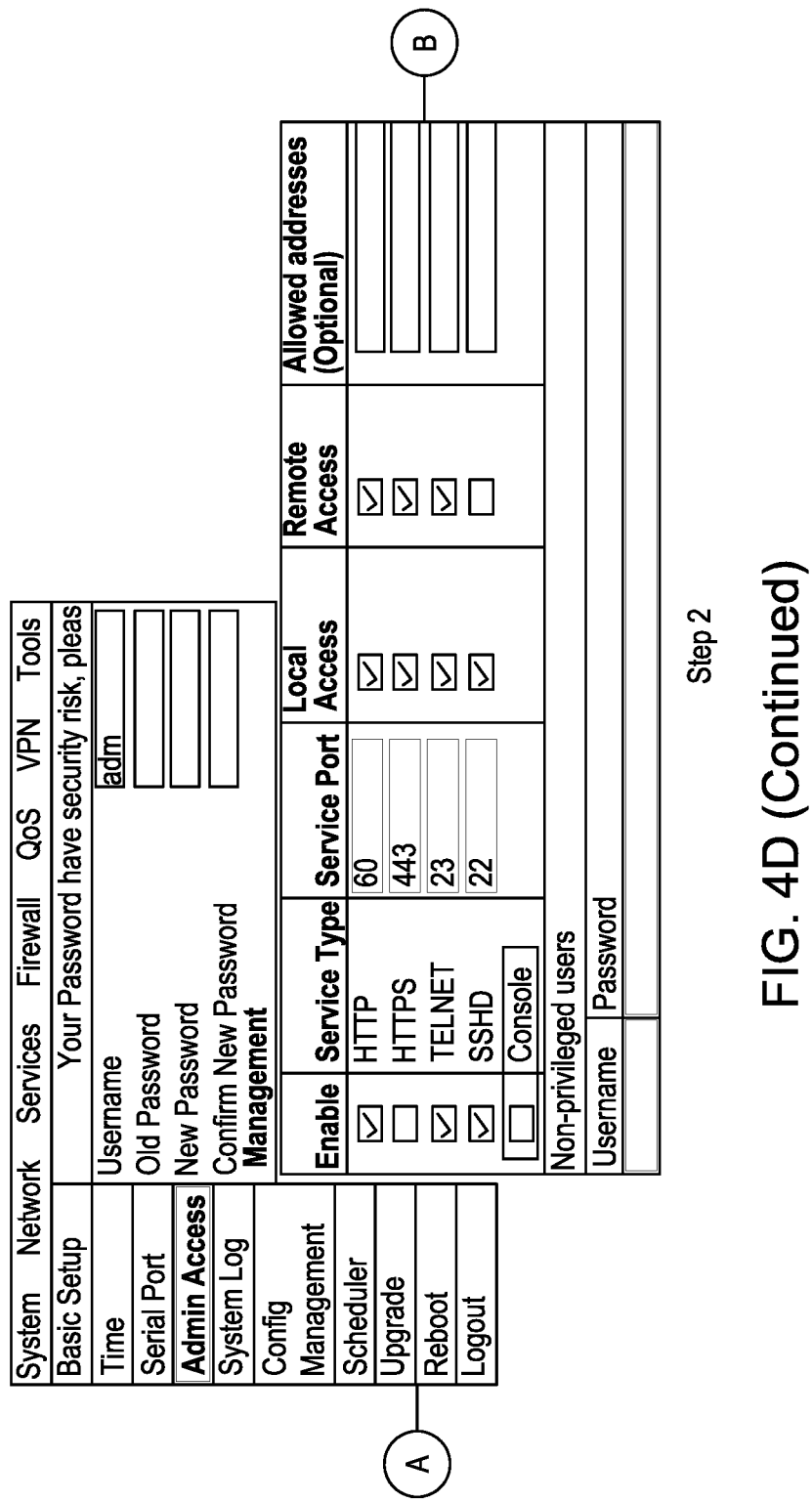

FIG. 4D illustrates configuration settings for the router 16 to monitor conditions of the UPS 20. In step 1, a user may use the menu system of the router's software to access serial ports and change the baudrate to "9600", the data bits to "8", the parity to "none" and the stop bit to "1". These would then be applied. In step 2, a user may use the menu system to access admin access and uncheck the "console" identifier and apply the setting. In step 3, a user may use the menu system to access services, then DTU, which would be enabled. The DTU protocol would be identified as "ModBus-Net-Bridge", with the protocol as "TCP", the listening port as "502" and the frame interval as "100" milliseconds. That configuration would then be applied.

FIG. 4E illustrates steps that may enable the sending of binary commands. In step 1, a modbus converter TCP connection to the router is initiated using the static IP address of the router via a VPN. In step 2, a TCP packet with a payload binary of 12 bytes as shown in FIG. 4E is sent to the modbus converter and on to the UPS, which responds in step 3 with a TCP packet with a payload of 10 bytes. Bit 00 indicates if the battery is "low" or is "good". Bit 01 indicates if the battery the battery is on, including if the UPS is unplugged or if AC power is not present. Bit 02 indicates if the battery is "missing" or is "good. Bit 03 indicates if the "battery needs to replace" or the "battery is good".

FIG. 4F illustrates use of a library of the modbus converter. In step 1, a modbut TCP connection to the router may be initiated in the same manner as step 1 of FIG. 4E. In step 2, the modbus converter sends a modbus read coil command, which may then provide the same TCP packet with the 10 byte payload indicating if the battery is low, whether it is on, whether the battery is missing and whether the battery needs to be replaced.

Figure 4G:
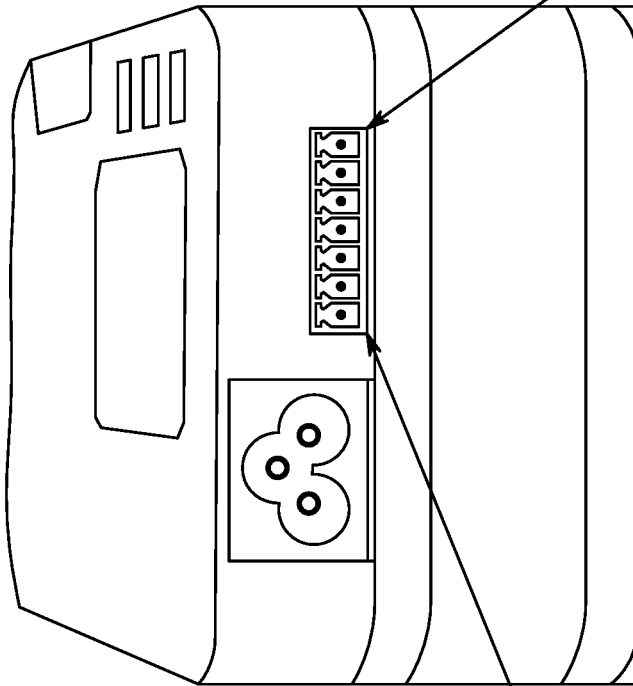
FIG. 4G illustrates a pinout configuration of a uninterruptable power supply in accordance with an embodiment.

FIG. 4G illustrates the pinout configuration of the UPS, with Pin 1 providing +12 V DC output, Pin 2 a DC output return, Pin 3 an alarm return, Pin 4 indicating low battery, Pin 5 indicating the battery being on, Pin 6 indicating if the battery is missing, and Pin 7 indicating if the battery needs replacing. Pins 4-7 are relay outputs while Pin 3 is the return of the relay outputs.

In an embodiment, a POTS alternative, comprising: an uninterruptible power supply (UPS); a router; a modbus converter connecting the router to the UPS to enable the router to monitor conditions of the UPS; a gateway providing connections to one or more POTS-based customer premises equipment through the modbus converter to the router and directly to the router, wherein the router including a SIM card, the SIM card for connecting to a first cellular service provider among a plurality of cellular service providers, wherein the router automatically connecting to the first cellular service provider when the first cellular service provider initially provides a cellular signal meeting one or more thresholds and switching from the first cellular service provider to a second cellular service provider when the first cellular services no longer meets the one or more thresholds and the second cellular service provider provides a second cellular signal meeting the one or more thresholds, and wherein a first combination of the gateway and the router and a second combination of the gateway, the modbus converter, and the router connect the one or more POTS-based customer premises equipment to a circuit switched telephone network.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed:

1. A plain old telephone service (POTS) alternative, comprising:
   an uninterruptible power supply (UPS);
   a router;
   a modbus converter connecting the router to the UPS to enable the router to monitor conditions of the UPS;
   a gateway providing connections to one or more POTS-based customer premises equipment through the modbus converter to the router and directly to the router,
   wherein the router including a SIM card, the SIM card for connecting to a first cellular service provider among a plurality of cellular service providers, wherein the router automatically connecting to the first cellular service provider when the first cellular service provider initially provides a first cellular signal meeting one or more thresholds and switching from the first cellular service provider to a second cellular service provider when the first cellular signal no longer meets the one or more thresholds and the second cellular service provider provides a second cellular signal meeting the one or more thresholds, and
   wherein a first combination of the gateway and the router and a second combination of the gateway, the modbus converter, and the router connect the one or more POTS-based customer premises equipment to a circuit switched telephone network.

2. The POTS alternative of claim 1, wherein the UPS further provides power to the one or more POTS-based customer premises equipment.

3. The POTS alternative of claim 1, wherein the router provides dynamic switching to a customer premises Internet router in addition to the first cellular service provider and the second cellular service provider.

4. The POTS alternative of claim 1, wherein the router includes a dynamic best network selection algorithm that automatically causes the SIM card to connect to a cellular service provider among the plurality of cellular service providers based on the one or more thresholds.

5. The POTS alternative of claim 1, wherein the modbus converter is a remote input/output controller that includes a plurality of digital relay outputs, a plurality of digital inputs, and a plurality of analog inputs, based on TCP or RS485 standards.

6. The POTS alternative of claim 1, wherein the one or more POTS-based customer premises equipment includes one or more of a fire system, a voice system, an elevator, a fax machine, a blue light system, a point of sale system, an alarm system, a security gate system, a door access system, a panic button, a meter reader, a modem/out of band management system, a supervisory control and data acquisition application, and an Internet backup.

7. The POTS alternative of claim 1, wherein the gateway is an analog voice over Internet protocol gateway.

8. The POTS alternative of claim 1, wherein the connections to one or more POTS-based customer premises equipment include conversion of traffic from Foreign eXchange Office connections, Foreign eXchange Subscriber connections, and Voice Over Interent Protocol (VOIP) connections.

9. The POTS alternative of claim 1, further comprising a software solution configuring the gateway to enable the gateway to support transmission of data to and from the one or more POTS-based customer premises equipment using outdated and/or obscure protocols.

10. The POTS alternative of claim 1, wherein the one or more thresholds include one or more of a Received Signal Strength Indicator (RSSI), a Received Signal Code Power (RSCP), an EC/IO (Energy per chip to Interference power ratio), a RSRP (Reference Signal Received Power), a SINR (Signal Interference+Noise Ratio), and a RSRQ (Reference Signal Received Quality).

11. A plain old telephone service (POTS) alternative, comprising:
an uninterruptible power supply (UPS);
a router;
a modbus converter connecting the router to the UPS to enable the router to monitor conditions of the UPS;
a gateway providing connections to one or more POTS-based customer premises equipment through the modbus converter to the router and directly to the router,
wherein the router including a SIM card, the SIM card for connecting a cellular service provider among a plurality of cellular service providers, wherein the router includes a dynamic best network selection algorithm that automatically causes the SIM card to connect to the cellular service provider based on the one or more thresholds, and
wherein a first combination of the gateway and the router and a second combination of the gateway, the modbus converter, and the router connect the one or more POTS-based customer premises equipment to a circuit switched telephone network.

12. The POTS alternative of claim 11, wherein the UPS further provides power to the one or more POTS-based customer premises equipment.

13. The POTS alternative of claim 11, wherein the router provides dynamic switching to a customer premises Internet router in addition to the first cellular service and the second cellular service.

14. The POTS alternative of claim 11, wherein the modbus converter is a remote input/output controller that includes a plurality of digital relay outputs, a plurality of digital inputs, and a plurality of analog inputs.

15. The POTS alternative of claim 14, wherein the plurality of analog inputs includes inputs based on TCP or RS485 standards.

16. The POTS alternative of claim 11, wherein the gateway is an analog voice over Internet protocol gateway.

17. The POTS alternative of claim 11, wherein the connections to one or more POTS-based customer premises equipment include conversion of traffic from Foreign eXchange Office connections, Foreign eXchange Subscriber connections, and Voice Over Interent Protocol (VOIP) connections.

18. The POTS alternative of claim 11, further comprising a software solution configuring the gateway to enable the gateway to support transmission of data to and from the one or more POTS-based customer premises equipment using outdated and/or obscure protocols.

19. The POTS alternative of claim 11, wherein the one or more POTS-based customer premises equipment includes one or more of a fire system, a voice system, an elevator, a fax machine, a blue light system, a point of sale system, an alarm system, a security gate system, a door access system, a panic button, a meter reader, a modem/out of band management system, a supervisory control and data acquisition application, and an Internet backup.

20. The POTS alternative of claim 11, wherein the one or more thresholds include one or more of a Received Signal Strength Indicator (RSSI), a Received Signal Code Power (RSCP), an EC/IO (Energy per chip to Interference power ratio), a RSRP (Reference Signal Received Power), a SINR (Signal Interference+Noise Ratio), and a RSRQ (Reference Signal Received Quality).

* * * * *